(12) United States Patent
Tiesler et al.

(10) Patent No.: US 7,470,208 B2
(45) Date of Patent: Dec. 30, 2008

(54) MULTISTEP AUTOMATIC TRANSMISSION WITH THREE PLANETARY GEAR TRAINS

(75) Inventors: Peter Tiesler, Meckenbeuren (DE); Armin Gierling, Langenargen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 318 days.

(21) Appl. No.: 10/577,483

(22) PCT Filed: Oct. 2, 2004

(86) PCT No.: PCT/EP2004/011031

§ 371 (c)(1),
(2), (4) Date: Apr. 27, 2006

(87) PCT Pub. No.: WO2005/047733

PCT Pub. Date: May 26, 2005

(65) Prior Publication Data
US 2007/0275812 A1  Nov. 29, 2007

(30) Foreign Application Priority Data
Oct. 30, 2003 (DE) ................................ 103 50 761

(51) Int. Cl.
*F16H 3/62* (2006.01)
(52) U.S. Cl. ..................................................... 475/278
(58) Field of Classification Search .................. 475/276, 475/278, 280, 284
See application file for complete search history.

(56) References Cited

U.S. PATENT DOCUMENTS 3,776,066 A  12/1973  Piret
3,977,272 A  8/1976  Neumann
4,070,927 A  1/1978  Polak
4,395,925 A  8/1983  Gaus (Continued)

FOREIGN PATENT DOCUMENTS

DE  26 19 895  11/1976

(Continued)

OTHER PUBLICATIONS

Tenberge, Prof. Dr. P., "E-Automat Automatikgetriebe mit Esprit", *VDI-Berichte*, Nr. 1610, VDI Verlag GmbH-Düsseldorf, Germany, Jun. 20, 2001, pp. 455-479.

*Primary Examiner*—Sherry L Estremsky
*Assistant Examiner*—Edwin A Young
(74) *Attorney, Agent, or Firm*—Davis Bujold & Daniels P.L.L.C.

(57) ABSTRACT

A multistep automatic transmission having an input shaft, an output shaft, three planetary gearsets and five shifting elements. A sun gear of the third planetary gearset is affixed above the first shifting element to a transmission housing. The input shaft is bound to a sun gear of the second planetary gearset and is bound above the second shifting element with a sun gear of the first planetary gearset and/or by way of the fifth shifting element with a link of the first planetary gearset. The output shaft is bound together with the internal gear of the first planetary gearset and one of the links of the second or third planetary gearset. The second planetary gearset is located in the middle of the three planetary gearsets and is placed beside the third planetary gearset. The second and fifth shifting elements are placed between the first and second planetary gearsets.

36 Claims, 11 Drawing Sheets

U.S. PATENT DOCUMENTS

| | | | |
|---|---|---|---|
| 4,732,253 | A | 3/1988 | Hiramatsu et al. |
| 4,939,955 | A | 7/1990 | Sugano |
| 5,106,352 | A | 4/1992 | Lepelletier |
| 5,232,411 | A | 8/1993 | Hayashi et al. |
| 5,250,011 | A | 10/1993 | Pierce |
| 5,295,924 | A | 3/1994 | Beim |
| 5,308,295 | A | 5/1994 | Michioka et al. |
| 5,342,257 | A | 8/1994 | Hotta et al. |
| 5,435,792 | A | 7/1995 | Justice et al. |
| 5,439,088 | A | 8/1995 | Michioka et al. |
| 5,455,767 | A | 10/1995 | Stärker |
| 5,460,579 | A | 10/1995 | Kappel et al. |
| 5,514,050 | A | 5/1996 | Bäuerle et al. |
| 5,520,588 | A | 5/1996 | Hall, III |
| 5,533,945 | A | 7/1996 | Martin et al. |
| 5,536,220 | A | 7/1996 | Martin |
| 5,542,889 | A | 8/1996 | Pierce et al. |
| 5,647,816 | A | 7/1997 | Michioka et al. |
| 5,735,376 | A | 4/1998 | Moroto et al. |
| 5,741,414 | A | 4/1998 | Waku et al. |
| 5,913,746 | A | 6/1999 | Bäuerle |
| 6,053,839 | A | 4/2000 | Baldwin et al. |
| 6,083,135 | A | 7/2000 | Baldwin et al. |
| 6,139,463 | A | 10/2000 | Kasuya et al. |
| 6,217,474 | B1 | 4/2001 | Ross et al. |
| 6,425,841 | B1 | 7/2002 | Haka |
| 6,471,616 | B2 | 10/2002 | Stevenson |
| 6,558,287 | B2 | 5/2003 | Hayabuchi et al. |
| 6,572,507 | B1 | 6/2003 | Korkmaz et al. |
| 6,609,439 | B1 | 8/2003 | Yamaguchi |
| 6,634,980 | B1 | 10/2003 | Ziemer |
| 6,723,018 | B2 | 4/2004 | Hayabuchi et al. |
| 6,860,831 | B2 | 3/2005 | Ziemer |
| 6,926,635 | B2 | 8/2005 | Biermann |
| 6,932,735 | B2 | 8/2005 | Kao et al. |
| 7,018,319 | B2 | 3/2006 | Ziemer |
| 2002/0183160 | A1* | 12/2002 | Kao et al. ................ 475/269 |
| 2003/0008737 | A1* | 1/2003 | Illerhaus et al. .............. 474/18 |
| 2003/0054917 | A1 | 3/2003 | Raghavan et al. |
| 2003/0060322 | A1 | 3/2003 | Raghavan et al. |
| 2003/0083174 | A1 | 5/2003 | Tabata et al. |
| 2003/0119623 | A1 | 6/2003 | Stevenson et al. |
| 2003/0162625 | A1 | 8/2003 | Raghavan et al. |
| 2003/0203784 | A1 | 10/2003 | Usoro et al. |
| 2005/0202927 | A1 | 9/2005 | Ziemer et al. |
| 2006/0068965 | A1 | 3/2006 | Gumpoltsberger |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 689 07 338 T2 | 11/1993 |
| DE | 43 30 391 A1 | 10/1994 |
| DE | 43 32 466 A1 | 3/1995 |
| DE | 195 24 698 A1 | 2/1996 |
| DE | 691 16 480 T2 | 6/1996 |
| DE | 196 10 950 A1 | 9/1997 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 695 14 737 T2 | 3/2001 |
| DE | 199 49 507 A1 | 4/2001 |
| DE | 100 43 751 A1 | 6/2001 |
| DE | 696 16 117 T2 | 7/2002 |
| DE | 102 00 379 A1 | 8/2002 |
| DE | 102 06 145 A1 | 9/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 10146 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| DE | 102 31 350 A1 | 1/2004 |
| EP | 0 434 525 A1 | 6/1991 |
| EP | 0 531 567 A1 | 3/1993 |
| EP | 0 378 900 B1 | 6/1993 |
| EP | 0 605 953 A1 | 7/1994 |
| EP | 0 719 961 A2 | 7/1996 |
| EP | 1 265 006 A2 | 12/2002 |
| EP | 1 411 269 A2 | 4/2004 |
| GB | 1 522 616 | 8/1978 |
| JP | 04119245 A | 4/1992 |
| JP | 4290649 | 10/1992 |
| JP | 08200456 | 8/1996 |
| JP | 10259861 | 9/1998 |
| JP | 2000234664 | 8/2000 |
| JP | 2000240741 | 9/2000 |
| JP | 2000291747 A | 10/2000 |
| JP | 2001082555 A | 3/2001 |
| JP | 2002323098 A | 11/2002 |
| WO | WO-96/01381 | 1/1996 |
| WO | WO-02/079670 A2 | 10/2002 |
| WO | WO-02/079671 A2 | 10/2002 |
| WO | WO-03/095865 A1 | 11/2003 |

* cited by examiner

| gear | closed shifting elements | | | | |
|---|---|---|---|---|---|
| | A | B | C | D | E |
| 1 | ● | | | ● | |
| 2 | ● | | ● | | |
| 3 | ● | ● | | | |
| 4 | ● | | | | ● |
| 5 | | ● | | | ● |
| 6 | | | ● | | ● |
| R | | ● | | ● | |

Fig. 2
Prior Art

MULTISTEP AUTOMATIC TRANSMISSION WITH THREE PLANETARY GEAR TRAINS

This application is a national stage completion of PCT/EP2004/011031 filed Oct. 2, 2004 which claims priority from German Application Serial No. 103 50 761.2 filed Oct. 30, 2003.

FIELD OF THE INVENTION

The present invention concerns a multistep automatic transmission with at least three individual planetary gearsets and at least five shifting elements.

BACKGROUND OF THE INVENTION

Automatic transmissions operating with several shiftable gear stages, and without a group-shifting procedure, are well known. DE 199 12 480 A1, for example, discloses an automatic transmission of this class having three individual planetary gearsets as well as three brake devices and two clutches for the shifting of six forward gears and one reverse direction gear. This disclosure provides a very satisfactory transmission ratio motor vehicles with a high overall spread of gear ratios and favorable gear stage accessibility to which can be added a high starting ratio in the forward direction. The individual gear stages are achieved by selective closing of respectively two of the six shifting elements so that for the switching from one gear position to the next successive higher or lower stage relative to the current activated shifting elements, respectively only one shifting element is opened and another shifting element is closed.

During this procedure, an input drive shaft of the automatic transmission is continually connected with a sun gear of the second planetary gearset. Further, the input drive shaft, by way of the first clutch, can be connected by a link to the first planetary gearset, and/or alternately, this connection can be made by the second clutch with a link of the first planetary gearset. Additionally, or as an alternate, the sun gear of the first planetary gearset can be made affixed to the housing of the automatic transmission by the first brake. This is also possible using the link of the first planetary gearset with the second brake. Yet a third method of making the connection to the transmission housing is to employ a sun gear of the third planetary gearset with the third brake.

For the kinematic coupling of the individual planetary gears with one another, DE 199 12 480 A1 teaches two different versions. In the first version, provision is made that an output drive of the automatic transmission is continually bound with a link of the third planetary gearset and an interior gear of the first planetary gearset. Moreover, a link of the first planetary gearset is continually in connection with an internal gear of the secondary planetary gearset and a link of the second planetary gearset is always in connection with an internal gear of the third planetary gearset. During this interconnected occurrence, the input drive shaft and the output drive shaft can be placed co-axially to one another on oppositely lying sides of the transmission housing or, just as well, be placed axis-parallel on the same side of the housing. In the second version, the provision is that the output drive shaft is continually bound with the link of the second planetary gearset and the interior gear of the first planetary gearset, while the link of the first planetary gearset is continually connected to the interior gear of the third planetary gearset and, finally that the internal gear of the second planetary gearset is continually in contact with the link of the third planetary gearset. A design of this kind is especially appropriate only for a co-axial arrangement of the input-output drive shafts.

Taking into consideration the spatial positioning of the planetary gearsets, the DE 199 12 480 A1 patent further proposes the co-axial placement of the three planetary gearsets in a row beside one another, whereby the second planetary gearset finds itself axially interposed between the first and the third planetary gearsets. In relation to the spatial arrangement of the individual shifting elements in regard to one another, and in regard to the planetary gearsets, the proposal of DE 199 12 480 A1 extends itself so that the first and second brakes are always positioned precisely next to one another, whereby the second brake borders itself always exactly directly on the first planetary gearset, and the third brake is always to be located on that side of the third planetary gearset which is remote from the third planetary gearset, while the two clutches are always directly located next to one another. In a first variation of positioning, both clutches are to be found upon that side of the first planetary gearset which is remote from the third planetary gearset, whereby the first clutch is placed immediately proximal to the first brake and nearer to the first planetary gearset than is the second clutch. In connection with a non-co-axial location of the input and output drives, in a second variation arrangement, the proposal of a second positioning variation is that both clutches are located on that side of the third planetary gearset, which is remote from the first planetary gearset, whereby the second clutch is placed nearer to the third planetary gearset than is the first clutch and axially borders an output spur gear, which is operationally connected with the output drive shaft which, once again, is placed on that side of the third brake, which is remote from the third planetary gearset.

The purpose of the present invention is to present alternative component positioning for the known automatic transmission arising from the state of the technology of DE 199 12 480 A1 to achieve a transmission construction of the most compact possible dimensioning. Advantageously the automatic transmission can find use in a motor vehicle non-co-axial transmission input drive shaft and transmission output drive shaft, with the comparatively, most simple modifications. Application can also be found in installation in a motor vehicle with a standard input drive and co-axial positioning of transmission input and transmission output drive shafts.

SUMMARY OF THE INVENTION

Basing a description on the typical state of the technology of DE 199 12 480 A1, the invented multistep transmission possesses at least three coupled, individual planetary gearsets, which are mounted co-axially to one another, wherein the second planetary gearset, as spatially observed, is placed always between the first and the second planetary gearsets. Furthermore, the invented automatic transmission possesses at least five shifting elements. A sun gear of the third planetary gearset can be affixed onto the housing of the automatic transmission by way of the first shifting element, which element is serving as a brake. An input drive shaft of the automatic transmission is continually connected with a sun gear of the second planetary gearset. In addition, the input drive shaft, by way of the second shifting element, which element is designed as a clutch, can be connected to second shifting element, which is serving as a clutch, with a sun gear of the first planetary gearset and, additionally or alternatively, by way of the fifth shifting element, which element is designed as a clutch with a link of the first planetary gearset. Alternatively, the sun gear of the first planetary gearset can be affixed to the transmission by way of the third shifting element, which functions as a brake and/or the link of the first planetary gearset by way of the fourth shifting element, which functions as a brake. Simultaneously, if the second and the fifth shifting elements are activated, then the sun gear and the link of the first planetary gearset are joined together.

An output drive shaft of the multistep automatic transmission is continually in active connection with an internal gear of the of the first planetary gearset, whereby the internal gear of the first planetary gearset is additionally continually bound with either with a link of the third planetary gearset or with a link of the second planetary gearset.

As is taught by the typical DE 199 12 480 A1, the link of the first planetary gearset (respectively according with the concept of a planetary gearset) is additionally either connected continually with the internal gear of the second planetary gearset or continually bound to the internal gear of the third planetary gearset. In case the internal gear of the first planetary gearset and link of the third planetary gearset and the output drive shaft are coupled together, the link of the second planetary gearset is continually connected with an internal gear of the third planetary gearset and the link of the first planetary gearset is continually connected with an internal gear of the second planetary gearset. In case the internal gear of the first planetary gearset and the link of the second planetary gearset and output drive shaft are connected to each other, then the link of the third planetary gearset is continually bound with the internal gear of the second planetary gearset and the link of the first planetary gearset is continually connected to the internal gear of the third planetary gearset.

In a differing embodiment to the typical DE 199 12 480 A1, according to the invention, both the fifth shifting element, by which the input drive shaft is bound to the link of the first planetary gearset, as well as the second shifting element, by way of which the input drive shaft is connected to the sun gear of the first planetary gearset, positionally observed, is to be found axially located between the first and the second planetary gearsets. The second and the third planetary gearsets are placed directly beside one another. Advantageously, in this arrangement, a lamella-packet of the fifth shifting element is placed on a larger diameter than is a lamella-packet of the second shifting element.

The first planetary gearset, at the most, is centrally penetrated in the axial direction by one shaft—especially, this being the input drive shaft of the automatic transmission. Accordingly also the second, central planetary gearset, at the most, is centrally penetrated in the axial direction by one shaft—especially, this being the input drive shaft.

In an advantageous embodiment of the invention, the second and the fifth shifting elements form a prebuilt-factory mounted assembly, which incorporates the respective lamella-packet and the respective servo-equipment components of these two shifting elements (clutches) as well as including a common lamella-carrier for these two shifting elements (clutches). The servo-equipment for the second shifting element, in respect to position, can be located either on that side of its lamella-packet which is proximal to the first planetary gearset (of the second shifting element), as well as on that side of its lamella-packet, which is proximal to the second planetary gearset. Even the servo-equipment of the fifth shifting element, where position is concerned, can be found either on that side (of the fifth shifting element) of its assigned lamella-packet proximal to the first planetary gearset or as well on that side of its lamella-packet which is proximal to the second planetary gearset.

In an additional embodiment of the invention, which is saving of installation length, and is favorable in cases of non-co-axial arrays of input drive shaft and output drive shaft of the automatic transmission, the proposal is to make an arrangement, wherein the fourth shifting element, by way of which the link of the first planetary gearset is affixed, and the third shifting element, by way of which the sun gear of the first planetary gearset is secured, are localized in an area radially located above the planetary gearsets. In an advantageous manner, it is possible that the third shifting element and the fourth shifting element can form a factory-assembled construction group with a common external lamella-carrier for these two shifting elements (brakes). Such a common external lamella-carrier would accept the lamella-packets of these two shifting elements (brakes) and are integrated into the at least parts of the servo-equipment of these two shifting elements (brakes).

As allowed by the radial construction clearance, which stands available for the automatic transmission, it is possible that the third shifting element can even be placed on the side of the first planetary gearset, which lies opposite to the second planetary gearset. This placement would be directly bordering on an outer wall of the housing of the automatic transmission.

In another embodiment of the invention, the first shifting element, by which the sun gear of the third planetary gearset is affixed, is positioned on the side of the third planetary gearset, which lie opposite to the second planetary gearset. Provision can also be made that the first shifting element, as to its positional state, can be placed in an area located radially above the third planetary gearset, this, for example, if the fourth shifting element is included, allowing for a factory assembled package. This said package would incorporate a common external lamella-carrier for the two shifting elements (brakes) and the lamella-packet of the same and also at least (integrated into the common external lamella-carrier) parts of the servo-equipment units of these two shifting elements (brakes). Obviously, the external lamella-carrier of the first shifting element can be integrated directly into the transmission housing or find a place in a housing cover, which is formed by an outer wall of the automatic transmission.

For the application of input and output drive shafts which are not co-axial to one another, especially for usage with shafts, which are axis-parallel or angularly arranged to one another, the proposal is that the first shifting element be located proximal to an outer wall of the transmission housing and a spur drive or a chain drive be placed axially between the third planetary gear drive and the first shifting element. As this is done, then a first spur gear of the spur drive or alternately, a first chain sprocket of the chain drive is necessarily bound to the internal gear of the first planetary gearset and—in accord with the wheel-set—either to the link of the third or the second planetary gearset. Accordingly then, an additional spur gear of the spur drive, that is to say, a second chain sprocket of the chain drive, is bound to the output drive shaft of the automatic transmission. In a favorable manner of manufacturing technology, it is possible that a servo apparatus and/or a lamella-carrier of the first shifting element, which element is serving as a brake, can be integrated into an outer wall or, if applicable, in a cover secured to the transmission housing.

In another version of the spur gear drive or its alternate, the chain drive arrangement, provision has been made that the first shifting element be placed at least partially axially beside the third planetary gearset on that side thereof, which is opposite to the second planetary gearset. Further, that the spur gear drive or the chain drive, in regard to location, be placed on the other side of the first shifting element, (thus on that side of the first shifting element, which is located oppositely to the third planetary gearset). When this is done, then a central, axial penetration of the sun gear of the third planetary gearset can be made by a hub, which hub is connected to the internal gear of the first planetary gearset and to the link of the third or second planetary gearset, the hub being further that of the first spur gear of the spur drive, or in the alternate, the first sprocket of the chain drive. In the case of an arrangement of this type, the first shifting element, which is designed as a brake, can be positioned beside the fourth shifting element, which is likewise serving as a brake whereby, in this case, advantageously one, identical lamella-diameter can be supplied for these two shifting elements, notably fulfilling an "equal-parts" concept.

In yet another embodiment of the spur gear or chain drive, provision can be made that the first shifting element be placed considerably radially above the third planetary gearset, and that the spur gear/chain drive, be located axially to the third planetary gearset, in particular on that side of the third planetary gearset, which is opposite to the second planetary gearset and thus extending itself to the first shifting element.

For an application with co-axial input/output drive shafts, the proposal is that the output drive shaft of the automatic transmission centrally and axially penetrates the first shifting element located beside the third planetary gearset and also penetrates the sun gear of the third planetary gearset, this being located in the axial area between the second and third planetary gearsets and further, the output drive shaft is connected with the link of the third or second planetary gearset.

By way of the invented interfitting of the five shifting elements and the three individual planetary gearsets, the total assembly achieves, as a whole, a very compact transmission construction. The feed lines to the servo-equipment of each of the five shifting element, by design, are comparatively easily assembled. The pressure medium for the activation of the two rotating clutches (second and fifth shifting elements) can be installed by way of only one rotating shaft. Correspondingly, it is also possible that lubricant for a dynamic pressure compensation of the two rotating clutches (second and fifth shifting elements) can simply be brought in by only one rotating shaft. The essentially inventive features of the proposed automatic transmission can be combined in even a non-co-axial—especially an axis parallel or angularly positioned—placement of transmission input and transmission output drive shafts as well as also with a co-axial arrangement of transmission input and transmission output drive shafts.

By way of the described kinematic coupling of the individual gearsets with one another and with the input and output drive shafts by the five shifting element there has been obtained—as in the case of state of the technology of the DE 199 12 480 A1—a total of six, available forward gear stages available which, by the shifting out of one gear stage into the next successive higher or lower gear stage from a given activated shift elements respectively only one shift element need be opened and one additional shifting element closed.

BRIEF DESCRIPTION OF THE DRAWINGS

The invention will now be described, by way of example, with reference to the accompanying drawings in which:

FIG. 2 is a shifting diagram in accord with FIG. 1;

DETAILED DESCRIPTION OF THE INVENTION

Figure 1:
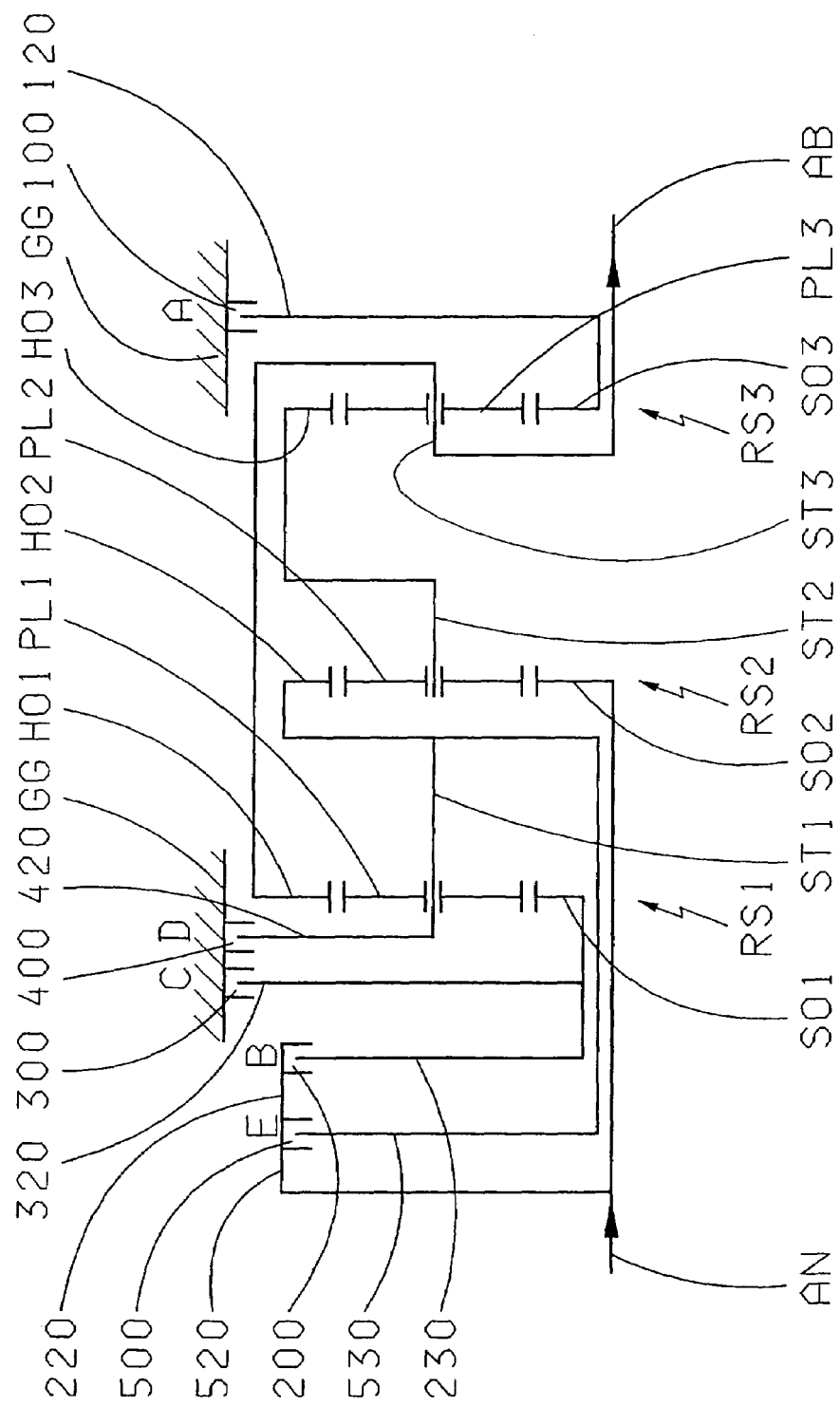
FIG. 1 is a schematic transmission in accord with the state of the technology.

As a clarification of the invented component arrangement, FIG. 1 presents first, a transmission scheme of a multistep automatic transmission for a motor vehicle with a standard power drive, as this would appear according to the state of the technology of DE 199 12 480 A1. Reference letters AN designate an input drive shaft of the automatic transmission. The shaft is connected with a (not shown) drive motor of the automatic transmission. The coupling to the motor would be by way of, for instance, a torque converter, a starting clutch, a torsion damper, a double weight flywheel or a fixed shaft. AB designates an output drive shaft of the automatic transmission, which is connected to at least one input drive shaft of the motor vehicle. In the embodiment which is shown, the input drive shaft AN and the output drive shaft AB are aligned co-axially to one another. RS1, RS2 and RS3 relate to three coupled, individual planetary gearsets, which are placed here in a row in a transmission housing GG. All three planet gearsets RS1, RS2 RS3 possess respectively a sun gear SO1, SO2 and SO3, again respectively an internal gear HO1, HO2 and HO3 as well as each having a link ST1, ST2 and ST3 with planetary gears PL1, PL2 and PL3. The planetary gears respectively mesh with the sun and the internal gears of the respective planetary gear. A to E designate five shifting elements, wherein the first, third and fourth shifting elements A, C, D serve as brakes and the second and fourth shifting element B, E are designed to function as clutches. The respective frictional coverings of the five shifting elements A to E appear as lamella-packets 100, 200, 300, 400 and 500 (respectively with outside and inside lamellas, that is, lamellas with steel and applied facings). The respective input elements of the five shifting element A to E are shown by 120, 220, 320, 420 and 520 and the respective output elements of the clutches B and E are designated by 230 and 530. The kinematic connection of the individual planetary gearsets and shifting elements, relative to one another, and relative to the input and output drive shafts were already described in detail in the opening passages, as was likewise the positional locations of these components.

As may be seen from the shifting scheme diagram in FIG. 2, there are available for shifting, by way of selection, respectively two of the five shifting elements A to E capable of attaining six forward gear stages in a group-shift-free manner. The shifting is also of such a nature that for the change of shift from one stage to the next higher or lower successive stage (from the currently activated shifting element) respectively only one shifting element need open as an additional shifting element closes. In the first gear stage "1", the brakes A and D are engaged, in the second gear stage "2", the brakes A and C, in the third gear stage "3", brake A and clutch B, in the fourth gear "4", brake A and clutch E, in the fifth gear stage "5", the clutches B and E and in the sixth gear stage "6", brake C and clutch E. In a reverse gear "R", clutch B and brake D are engaged.

Considering now the FIGS. 3 to 11, in the following, nine examples for an invented component, positional disposition is explained in detail, for example in connection with a non-co-axial alignment of the input and output drive shafts.

Figure 3:
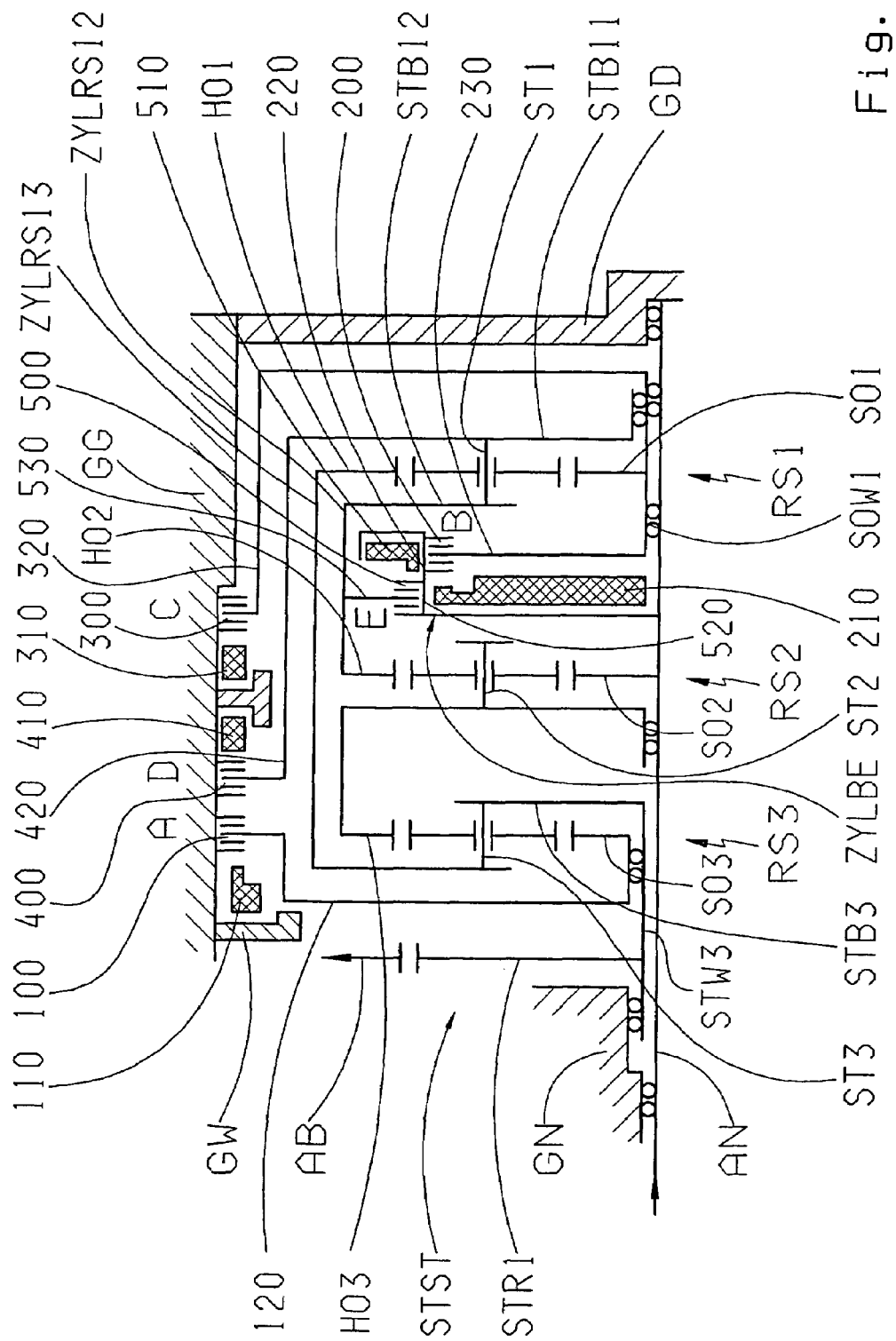
FIG. 3 is an example of a first schematic arrangement of components in accord with the invention.

FIG. 3 shows a first schematic component arrangement, giving an example of the achievement of the purpose of the invention. Starting considerations on the basis of the previously described state of the technology of DE 199 12 480 A1, the invented multi-step automatic transmission possesses the three individual planetary gearsets RS1, RS2, RS3, which are aligned co-axially to one another. Positionally considered, the second planetary gearset RS2 is placed axially between the first and the third planetary gearsets RS1, RS3 and borders, again axially, directly on the third planetary gearset RS3. Furthermore, the invented automatic transmission possesses five shifting elements A to E. The first, third and fourth shifting elements, namely A, C, D are respectively designed to serve as individual brakes (in the example, respectively as a lamella-brake). The second and fifth shifting elements B, E are constructed as clutches (in the example, respectively as lamella-clutches). A sun gear SO3 of the third planetary gearset RS3 is rigidly affixed by way of a brake A to the gearbox housing GG of the automatic transmission. An input drive shaft AN of the automatic transmission is continually in connection with a sun gear SO2 of the second planetary gearset RS2. Furthermore, the input drive shaft AN can be connected by way of the clutch B with a sun gear SO1 of the first planetary gearset RS1. Additionally or alternatively by way of the clutch E with the link ST1 of the first planetary gearset RS1. Alternatively the sun gear SO1 of the first planetary gearset RS1 by way of the brake C and/or the link ST1 of the first planetary gearset RS1 by way of the brake D can be rigidly affixed to the gear train housing GG.

An output drive shaft AB of the multistep automatic transmission is continually in operational communication with an internal gear HO1 of the first planetary gearset RS1, whereby this internal gear HO1, by way of the illustrated, exemplary coupling of the planetary gear element, is continually in connection with the link ST3 of the third planetary gearset RS3. In addition, the link ST2 of the second planetary gearset RS2 is continually bound to an internal gear HO3 of the third planetary gearset RS3, and as well, link ST1 of the first planetary gearset RS1 is continually in operative connection with the internal gear HO2 of the second planetary gearset RS2. The corresponding connection element between the internal gear HO1 of the first planetary gearset RS1 and the link ST3 of the third planetary gearset RS3 is designed as a cylinder ZYLRS13. This cylinder ZYLRS13 is, in the first place, in connection with the internal gear HO1 by way of a purpose-appropriate means, for instance, this being a welded jointure, and extends itself in an axial direction from the internal gear HO1 up to a point over the internal gear HO3. In the second place, the cylinder ZYLRS13 is connected on that side of the third planetary gearset RS3, which side is remote from the second planetary gearset RS2, and joined thereto by a designed operative connection with an interconnection STB3 which is integral with the link ST3. The interconnection means can be, for example, a structural configuration common to both STB3 and ST3. The cylinder ZYLRS13 completely encapsulates the second and third planetary gearsets RS2, RS3.

In the embodiment example shown in FIG. 3, input drive shaft AN and output drive shaft AB are not aligned co-axially with one another. For an operative connection between the output drive shaft AB and the link ST3 of the third planetary gearset RS3 (and with the internal gear HO1 of the first planetary gearset RS1 which is bound to this link ST3), provision has been made for a spur gear drive STST. As already mentioned, the cylinder ZYLRS13 completely encapsulates the third planetary gearset RS3 in the axial direction. In this arrangement, the cylinder ZYLRS13 is bound to the link ST3 on that side of the third planetary gearset RS3 which is remote from the second planetary gearset RS2. The interconnection piece of the link ST3, which piece is facing the second planetary gearset RS2, is designated as STB3, and extends itself radially inward up to a diameter approaching that of the input drive shaft AN. On its inside diameter, the interconnection piece STB3 is bound to a linkage shaft STW3. Extending away from the linkage piece STB3, this linkage shaft STW3 proceeds in a direction opposite to that of the second planetary gearset RS2, but co-axial with the input drive shaft AN and radially above the input drive shaft AN, and in this passage, centrally engages the sun gear SO3 of the third planetary gearset RS3. On that side of the third planetary gearset RS3, which is opposite to the second planetary gearset RS2, is to be found the link-shaft STW3, connected with a first spur gear STR1 of the spur gear stage STST and further rigidly fastened onto a transmission housing secured hub GN. The link shaft STW3 forms also, more or less, the hub of this first spur gear STR1. The sun gear SO3 of the third planetary gearset RS3 is advantageously supported on the link shaft STW3.

All three planetary gearsets RS1, RS2 and RS3 are penetrated in an axial direction, along the centerline, by the input drive shaft AN. In the embodiment example shown in FIG. 3, (for simplification not shown) an input drive motor is operatively connected with the input drive shaft AN on that transmission side which is remote from the first planetary gearset RS1. From FIG. 3, one can easily infer that in connection with non-co-axial arrangement of the input drive shaft AN and the output drive shaft AN, the input drive motor can be placed at either of the two end faces of the transmission.

The brake A, by way of which the sun gear SO3 of the third planetary gearset is affixed, as to position, is located partially radially above the third planetary gearset RS3 and partially on that side of the third planetary gearset RS3, which is remote from the second planetary gearset RS2. With this alignment, the input element 120, serving as an inner lamella-carrier borders the brake A axially on the link ST3 of the third planetary gearset RS3, upon the side thereof distal from the second planetary gearset RS2. A lamella-packet 100 of the brake A, of large diameter and having lamellas of both external and applied facings is located in the area of the cylindrical outer wall of the transmission housing GG, seen in the axial direction, this is radially above the third planetary gearset RS3. An appropriate structural configuration for the outer lamellas of the lamella-packet 100 can be easily integrated into the transmission housing GG. Obviously, for the brake A, however, separate outside lamella-carriers are provided which, correspondingly by appropriate means, can be bound with the transmission housing GG using binding means characterized by shape, force or material gripping. On that side of the inner lamella-carrier 120 of the brake A, which is remote from the third planetary gear RS3, the spur gear STR1 borders axially and directly on a disk-shaped section of this inner lamella-carrier 120.

Likewise, on that side of the third planetary gearset RS3, which is remote from the second planetary gearset RS2, and seen in axial direction into the area between the spur gear STR1 and planetary gearset RS3, and as seen in the radial direction into the area of the cylindrical outer wall of the transmission housing GG, is to be found a servo apparatus 110 of the brake A for the activation of the lamella 100, integrated in a simple manner into the transmission housing GG and a housing wall GW bound with the transmission housing GG (for example, bolted thereto). Obviously it is possible that this housing wall can be designed also as a part of the transmission housing, thus as a housing section of radial extent. Housing wall GW and transmission housing GG possess a corresponding piston space (pressure chamber), in which a piston (for simplification, not shown), which is subjected to pressure applications of the servo apparatus 110 is slidingly supported, as well as a corresponding (once again, not shown) pressure medium feed to this pressure chamber. In the case of a pressure application to this pressure chamber for the piston, the piston activates the servo apparatus 110, the lamellas 100 of the brake A to move axially in the direction of the three planetary gearsets RS1, RS2, RS3. It is obvious to the expert, that the positional locating of the servo apparatus 110 and/or the lamellas 100 of the brake A, especially as seen in axial direction, is not limited to that distribution as shown in the exemplary illustration of FIG. 3. Thus, it is possible that servo apparatuses 110 and/or lamella 100 of the brake A, for instance, even of a smaller diameter can be placed even in the axial area between the spur gear stage STST and the planetary gearset RS3 or, alternately, pushed in the direction of the planetary gearset RS1, thus in an area above the second planetary gearset RS2 or, again, over the first planetary gear RS1.

The clutch B, by way of which the input drive shaft AN can be bound with the sun gear SO1 of the first planetary gearset RS1, and the clutch E, by way of which the input drive shaft AN can be connected to the link ST1 of the first planetary gearset RS1 are, in positional consideration, located between the first and second planetary gearsets RS1, RS2. In such an arrangement, the clutch E, as seen in an axial direction, placed radially above the clutch B. The lamellas 500 of the clutch E, which are subjected to the full input drive torque, possess, accordingly, a greater diameter than do the lamellas 200 of the clutch B and are thus placed by a comparatively large diameter radially underneath the cylinder ZYLRS13.

In the illustrated example of FIG. 3, for both clutches B, E, a common lamella-carrier ZYLBE is provided, which first, forms an outer lamella-carrier for the clutch B (input element 220 for the clutch B) and second, forms for the clutch E an inner lamella-carrier (input element 520 for the clutch E). As is shown in FIG. 3, the outer lamellas of the lamella-packet 200 and the inner lamellas of the lamella-packet 500, in this instance are advantageously made of steel. The inner lamellas of the lamella-packet 500 are correspondingly supplied with covered lamellas.

The common lamella-carrier ZYLBE for the two clutches B, E is designed as a pot, with its opening in the direction of the first planetary gearset RS1, with a disk-shaped pot bottom, which borders axially and directly on the link ST2 of the second planetary gearset RS2 and is connected on its inner diameter with the input drive shaft AN. The cylindrical section, which extends itself axially in the direction of the first planetary gearset RS1 of the lamella-carrier ZYLBE possesses on its outside diameter a characteristic structural profile complementary to the inner lamellas of the clutch E and on its inside diameter has characteristic structural profile complementary to the outside lamellas of the clutch B. Considered from a positional standpoint, with this arrangement, then the complementary structural configuration for the inner lamellas of the clutch E are placed closer to the second planetary gearset RS2 than is the complementary structural configuration for the outside lamellas of the clutch B. Correspondingly, also the lamella-packet 500 of the clutch E is placed nearer to the second planetary gearset RS2 than is the lamella-packet 200 of the clutch B. That part of the cylindrical section of the lamella-carrier ZYLBE with the complementary structural profile for the inner-lamellas of the clutch E forms also, together with the disk-shaped pot bottom of the lamella-carrier ZYLBE, the input element 520 of the clutch E. Correspondingly, that part of the cylindrical section of the lamella-carrier ZYLBE, along with the complementary structural configuration for the outside lamellas of the clutch B the input element 220 for the clutch B. The input element 220 of the clutch B is consequently bound to the clutch E by way of the input element 520 with the input drive shaft AN.

A servo apparatus 210 of the clutch B is, from a location standpoint, placed within the cylinder space of the lamella-carrier ZYLBE, borders accordingly first, at least sectionally and axially, directly on the disk-shaped section (pot-bottom) of the lamella-carrier ZYLBE and second, is placed at least sectionally radially below the lamella-packet 500 of the clutch E. The servo apparatus 210, in this arrangement includes, at least one (for the sake of simplification, not shown) pressure chamber, and one (here again, not shown) piston. In the case of an application of pressure in this pressure chamber, this piston activates the lamella-packet 200 in the known manner, acting against a resisting force of a (again, not shown) retraction element of the servo apparatus 210 axially in the direction of the first planetary gearset RS1. Since the lamella-carrier ZYLBE rotates continually with the speed of rotation of the input drive shaft AN, it is advantageous that the servo apparatus 210 possesses a dynamic pressure compensation means for the compensating of the rotating pressure of the pressure chamber of the servo apparatus 210 which rotates at the speed of the input drive shaft AN.

The release element 230 of the clutch B is here designed as a disk shaped inner lamella-carrier which, starting as a characteristic complementary structural configuration to the inner lamellas of the clutch B and is axially bordering on the servo apparatus 210, extends itself radially inward up to a sun shaft SOW1, to which it is bound. This sun shaft SOW1 is supported on the input drive shaft AN and extends itself—coaxially to the input drive shaft AN—axially first in the direction of the first planetary gearset RS1 and is connected to the sun gear SO1 of the first planetary gearset RS1. In this axial section, the sun shaft SOW1 forms also, partially, the hub of the inner lamella-carrier 230 of the coupling B. In a further axial run the sun shaft SOW1, centrally and completely penetrates the first planetary gearset RS1 and extends itself axially to a housing cover GD, which is connected with the transmission housing GG. Obviously, the housing cover GD and the transmission housing GG can be of one-piece construction. On that side of the first planetary gearset RS1, which side is remote from the clutch B, is to be found a link piece STB11 of the link ST1 supported on the sun shaft SOW1. Details on the additional kinematic connection of the output element 230 of the clutch B on the brake C will be discussed later.

A servo apparatus 510 of the clutch E is placed, in regard to its position, above the input element 220 of the clutch B. For the acceptance of this servo apparatus 510, the lamella-carrier ZYLBE possesses an additional cylindrical space which, when seen in the axial direction, is located considerably radially above the part of the cylindrical section of the lamella-carrier ZYLBE, which has the complementary structural piece for the outer lamellas of clutch B. The servo apparatus 510 encompasses, in this arrangement, at least one (not shown) pressure chamber and a piston (not shown). In the case of a pressure application of this pressure chamber, this piston activates the lamella-packet 500 in the known manner against a resetting force of a here (not shown) return element of the servo apparatus 210 acting axially in the direction of the second planetary gearset RS2. Since the lamella-carrier ZYLBE rotates constantly with the speed of rotation of the input drive shaft AN, it is advantageous that the servo apparatus 510 also possesses a dynamic compensation means for the compensation of the rotational pressure of the rotating pressure chamber of the servo apparatus 510.

The output element 530 of the clutch E is, in this case, designed as a disk-shaped outer lamella-carrier, which extends itself from a characteristic complementary structural piece for the acceptance of the outer lamella of the clutch E, and bordering on servo apparatus 510, radially outward up to a cylinder ZYLRS12, with which it is connected. This cylinder ZYLRS12 forms the kinematic connection between the link ST1 of the first planetary gearset RS1 and the internal gear HO2 of the second planetary gear RS2. This, looked at in regard to position, is placed underneath the cylinder ZYLRS13 and extends itself in the axial direction from the internal gear HO2 linkage piece STB11 of the link ST1, which is proximal to the planetary gearset RS2. Directly from the principle, in this service the cylinder ZYLRS12 can be interpreted as a part of the output element of the clutch E.

As may be seen in FIG. 3, the brake C and the brake D are placed next to one another, these brakes being respectively, brake C by way of which the sun gear SO1 of the first planet gearset RS1 is secured to the transmission housing GG and the brake D, by way of which the link ST1 of the first planet gearset RS1 (plus the thereto bound internal gear HO2 of the second planetary gearset RS2) is likewise affixed to the transmission housing GG. From the location standpoint, the brakes are placed radially above the planetary gearsets at a comparatively large diameter in the area of the inside diameter of the transmission housing GG. In this arrangement, the lamella-packet 400 borders the brake D axially at the lamella-packet 100 of the brake A and is placed, again considering location, for example in an area radially above the two directly neighboring planetary gearsets RS2 and RS3. The lamella-packet 300 of the brake C is here located in an area radially disposed above the planetary gearset RS2 and the clutch E, which is directly neighboring the planetary gearset RS2. The brake C, in this arrangement, is thus placed closer to the first planetary gearset RS1 than is the brake D, that is to say, the brake D is in this location nearer to the third planetary gearset RS3 than is the brake C.

In the example illustrated in FIG. 3, the transmission housing GG takes over simultaneously the function of an outside lamella-carrier for the two brakes C, D. In another constructive arrangement, obviously, it is possible that separate outside lamella-carriers for the brakes C, D could be provided, which then, by appropriate means, would be turn-fast bound to the transmission housing or even one lamella-carrier could commonly suffice for both brakes C, D.

Servo apparatuses 410, 310 serving the lamella-packets 400, 300 are placed axially, next to one another between these two lamella-packets 400, 300. In the example illustrated in FIG. 3, the two servo apparatuses 410, 310 are integrated into a common transmission housing component having corresponding piston travel space, that is to say, pressure chambers, in which the spaces, respectively, is placed at least one slidably supported piston, capable of being subjected to pressure and part of the respective servo apparatus 310, 410. In the case of a feed of pressurized media to the pressure chamber of the servo apparatus 410, the piston activates the lamella-packet 400 of the brake D axially in the direction of the brake A, that is to say, of the third planetary gearset RS3, that is, in a direction opposite to that approaching the first planetary gearset RS1. Accordingly, the piston energizes the servo apparatus 310 upon a feed of pressure medium to the piston space of the servo apparatus 310 and moves the lamella-packet 300 of the brake C axially in the direction of the first planetary gearset RS1. For the expert, can be seen without difficulty, that the pressurized media feed to these two servo apparatuses 310, 410 is a simple matter.

With a construction of appropriate design, it is possible to integrate the servo apparatuses 410, 310 directly into the transmission housing. For example, if a common outside lamella-carrier is provided for the two brakes C, D as a separate component, the servo apparatuses 410, 310 can also be integrated into this outside lamella-carrier in a simple manner so that, in this case, manufacturing technology can form a factory made, advantageously premounted assembly package.

As FIG. 3 further demonstrates, the described component arrangement enables a duplicate-part concept, at least for the lamellas 300, 400 and, if necessary, also for the servo apparatuses of the brakes C and D, and further for the lamellas 100, 300, 400 of all brakes A, C and D of the automatic transmission.

An input element designates as 420 of the brake D is designed as a cylindrically shaped inner lamella-carrier which, positionally considered, extends itself sectionally radially above the cylinder ZYLRS13 and further encapsulates the first and second planetary gearsets RS1, RS2 and on that side of the first planetary gearset RS1, which is remote from the second planetary gearset RS2 binds itself with the link ST1 of the first planetary gearset RS1. The characteristic linkage part of the link ST1 located opposite to the second planetary gearset RS2 is designated as STB11. For the reinforcement of the inner lamella-carrier 420 of the brake D, the linkage part STB11 is supported on the sun shaft SOW1.

An entry element of the brake C, designated as 320, is fabricated as a cylinder-shaped, inner lamella-carrier which, as to positional characteristics, extends itself radially above the cylindrical section of the inner lamella-carrier 420 of the brake D and the entry element also encapsulates the cylinder ZYLRS13. Further, the entry element 320 envelopes the first planetary gearset RS1 in a radial direction along with the two clutches B, E and on that side of the link piece STB11 which is remote from the second planetary gearset RS2 binds itself with the sun shaft SOW1. The disk-shaped cylinder bottom of the inner lamella-carrier 320 of the brake C borders, in this arrangement, on the housing cover GD which, as already described, forms an outer wall of the automatic transmission.

For the accommodation of the outer contour of the transmission housing within an actual installation space designated for the installation of the automatic transmission, it is possible that the spatial situation of the two brakes D, C can obviously be slidingly moved in the axial direction as compared to the example presented in FIG. 3.

The component arrangement presented in FIG. 3, as to positional condition, would allow the achievement of a narrower construction of a transmission. Since the input drive shaft of the entire transmission proceeds in an axial direction, the component arrangement shown in FIG. 3, which has a non-co-axial alignment of the input drive shaft and the output drive shaft, for the expert, it would be constructively simple to make a conversion to an application wherein the input drive shaft and the output drive shaft run co-axially to one another.

The shifting scheme of the multistep automatic transmission in accord with FIG. 3 corresponds to the shifting scheme presented in FIG. 2. In accord with the state of the technology of DE 199 12 480 A1, it is possible that with selective shifting of respectively two of the five shifting elements, again six forward gear stages can be shifted into, free of group-shifting involvement.

In consideration of the FIGS. 4 to 8, five further invented component arrangements are closely explained, all having, converse to the previously detailed description of the first component arrangement in accord with FIG. 3, unchanged kinematic coupling of the planetary gear elements between one another and to the shifting elements, all also with a construction assembly derived from the clutches B and E and which assembly is located axially between the first and the second planetary gearsets RS1, RS2 whereby the clutch B, as to position, is placed radially underneath the clutch E and in a clutch space formed by this said clutch E.

Figure 4:
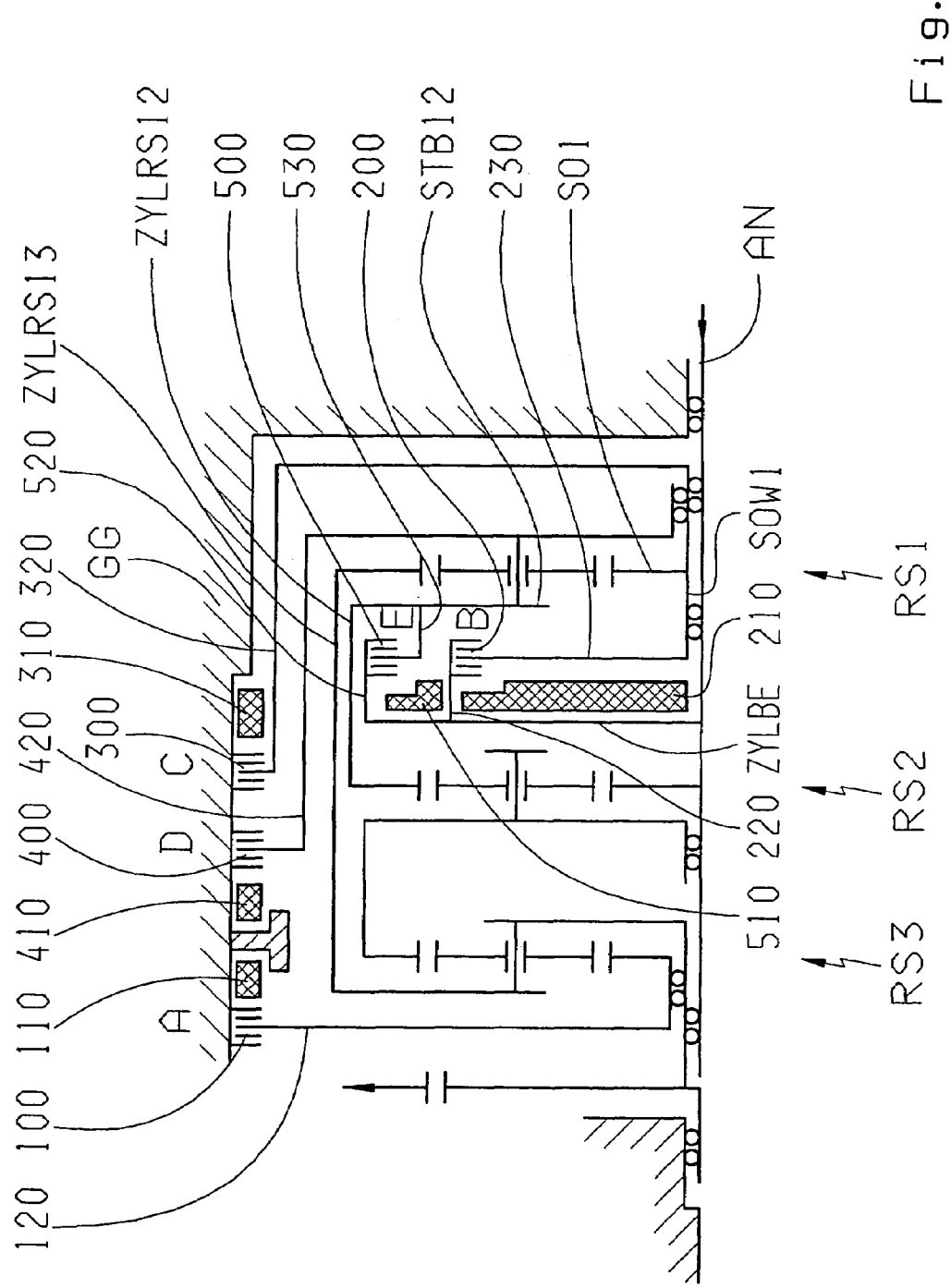
FIG. 4 is an example of a second schematic component arrangement in accord with the invention.

FIG. 4 shows a second schematic component arrangement, as an example of achieving the purpose of the invention. The essential difference to the first component arrangement as shown in FIG. 3 are the designed formation of the assembly with the two clutches B, E and the spatial allowance of the servo apparatuses of the three brakes A, C and D relative to their lamella-packets.

As may be seen in FIG. 4, the assembly comprises the two clutches B, E, a lamella-carrier ZYLBE, a radial inner lamella-packet 200 with servo apparatus 210 of the clutch B, and further includes a radial outer lamella-packet 500 with servo apparatus 510 of the clutch E. As a difference to FIG. 3, the outer lamellas of both lamella-packets 200, 500 are advantageously steel-lamellas, the inner lamellas of both lamella-packets 200, 500 then have, correspondingly coating or cover material. The lamella-carrier ZYLBE is presently designed as a pot-shaped double cylinder with a disk-like pot bottom, which is connected on its inside diameter with input drive shaft AN, and additionally possesses two cylindrical sections which are independent of one another and which extend themselves from the pot bottom outward and axial in the direction of the first planetary gearset. The diameter of the first of these two cylindrical sections is advantageously somewhat greater than the diameter of the link of the neighboring planetary gearsets RS1 and RS2. The diameter of the second of these two cylindrical sections represents, more or less, the diameter of the internal gear of the neighboring planetary gearsets RS1 and RS2 but, however, is in any case, somewhat smaller than the diameter of the cylinder ZYLRS12 which, as is known, forms the operational connection between the internal gear of the second planetary gearset RS2 and the link of the first planetary gearset RS1. The lamella carrier ZYLBE serves both clutches B, E, the entry element thereof 220, 520 and again, for both clutches B, E also forms the outside lamella-carrier. Correspondingly the (radial inner) first cylindrical section of the lamella-carrier ZYLBE possesses on its inner diameter a characteristic complementary structural shaping suitable for the lamella-packets 200 of the clutch B, and the (radial outer) second cylindrical section of the lamella-carrier ZYLBE on its inner diameter possesses a characteristic complementary structural shaping suitable for the outer lamellas of the lamella-packet 500 of the clutch E. Observed as to positional characteristics, the lamella-packet 500 is placed at least considerably radially above the lamella-packet 200.

The servo apparatus 210 of the clutch B is placed, from a positional standpoint, inside the cylinder space of the lamella-carrier ZYLBE, which is formed by the (radial inner) first cylindrical section of the lamella-carrier ZYLBE and according borders, at least partially, axially directly on the disk-shaped section (pot bottom) of the lamella-carrier ZYLBE. The servo apparatus 210 includes, in this arrangement, at least one (not shown) pressure chamber and one (not shown) piston. In the case of an application of pressure of this pressure chamber, this piston activates the lamella-packet 200 of the clutch B in a known manner against an opposing force of a reset element of the servo apparatus 210 (not shown), working axially in the direction of the first planetary gearset RS1.

The servo apparatus 510 of the clutch E, considered as to position, is placed within the cylinder ring space of the lamella-carrier ZYLBE, which the space is formed by the (radial outward) second cylindrical section of the cylinder ZYLBE, and is limited in extent inward, by the (radial inward) first cylindrical section of the lamella-carrier ZYLBE. In the same manner as the servo apparatus 210 borders the servo apparatus 510, at least in a sectional manner and axially direct on the disk-shaped section (pot bottom) of the lamella-carrier ZYLBE. The servo apparatus 510 encompasses, in this application, at least one (not shown) pressure chamber and one piston (not shown). Upon an application of pressure to this pressure chamber, the piston activates the lamella-packet 500 of the clutch E in the known manner, against a resetting force of a retraction element of the servo apparatus 510 (not shown), acting axially in the direction of the first planetary gearset RS1.

Since the lamella-carrier ZYLBE continually rotates with the rotational speed of the input drive shaft AN, it is to an advantage that both servo apparatuses 210 and 510 also possess a dynamic pressure compensation for the evening out of the rotational pressure of these servo apparatuses 210, 510, which rotate with the input drive shaft AN speed.

One output element 230 of the clutch B—as in FIG. 3—is designed as a disk shaped inner lamella-carrier, which bases itself on a characteristic, complementary structural part for the acceptance of the inner lamellas of the lamella-packet 200 of the clutch B, and extends itself to border axially on the servo apparatus 210 of the clutch B, and radially extends itself inward up to the sun shaft SOW1, which is supported on the input drive shaft AN. Similar to the depiction in FIG. 3, this sun shaft SOW1 centrally penetrates the first planetary gearset RS1 and is bound to both the inner lamella-carrier 230 of the clutch B as well as with the sun gear SO1 of the first planetary gearset RS1 and the entry element 320 of the brake C.

An output element 530 of the clutch E—conversely to FIG. 3—is designed as an inner lamella-carrier. Proceeding from a characteristic complementary structural shape for the acceptance of the inner lamella of the lamella-packet 500 of the clutch E, and axially bordering on the servo apparatus 510 of the clutch E, this inner lamella-carrier 530 extends itself to one diameter above the (radial inner) first cylindrical section of the lamella-carrier ZYLBE, proceeding in an axial direction in the direction of the first planetary gearset RS1 up to the linkage part STB12 of the first planetary gearset RS1 and is bound to this linkage part STB12.

As can be further seen in FIG. 4, the brakes A, D, C, similar to FIG. 3, are to be found at the inner diameter of the transmission housing GG, placed in an area radially above the two planetary gearsets RS3, RS2 and the clutch E, however, the activation direction is changed from that of FIG. 3 for all three servo apparatuses 110, 410, 310 of the brakes A, D, C. The servo apparatus 110 of the brake A and the servo apparatus 410 of the brake D are now directly axially placed next to one another, that is, axially between the lamella-packets 100, 400 of the to brakes A, D and, in this arrangement, for example, integrated into a common component, affixed to the transmission housing. The lamella-packet 100 of the brake A is now at least partially seen in the axial direction next to the third planetary gearset RS3 upon that side which is remote from the second planetary gearset RS2, on a diameter greater than that of the ZYLRS13 which, as known, forms the operational binding between link of the third planetary gearset RS3 and the internal gear of the first planetary gearset RS1. The lamella-packet 400 of the brake D is, as to location, is placed somewhat radially above the second planetary gearset RS2 and, upon closure by the servo apparatus 410 actuated (i.e., pushed) radially in the direction of the first planetary gearset RS1. Correspondingly axial inverted, is the activation direction of the servo apparatus 110 upon closure of the lamella-packet 100 of the brake A. The lamella-packet 300 of the brake C borders at present directly on the lamella-packet 400 of the brake D and is, as to its location, placed likewise somewhat radially above the second planetary gearset RS2. Correspondingly, the servo apparatus 310 of the brake C here, for example, integrated in the transmission housing GG is at least principally radially placed above the clutch E and actuates the lamella-packet 300 upon closure axially in the direction of the neighboring brake D, that is, in that direction which is opposite to that toward the first planetary gearset RS1.

The input element 120 of the brake A is now designed to be at least considerably disk-like and extends itself in a radial direction parallel to the third planetary gearset RS3. The input element 420 of the brake D and 320 of the of the brake C are principally unchanged from their function as shown in FIG. 3.

Figure 5:
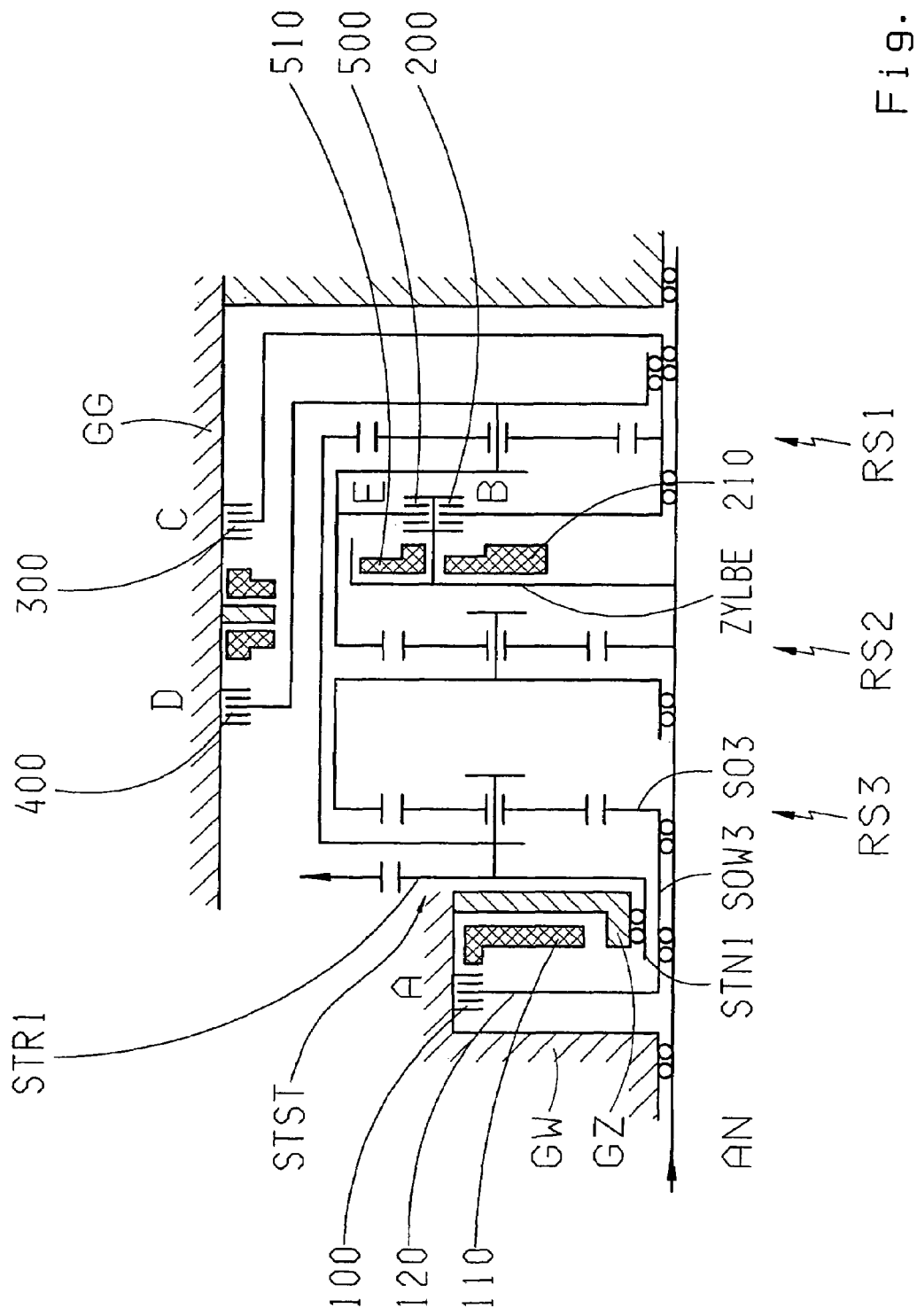
FIG. 5 is an example of a third schematic component arrangement in accord with the invention.

FIG. 5 shows a third schematic component arrangement as an exemplary, invented, achievement of the executing the purpose of the invention. Compared to the first component arrangement as per FIG. 3, that arrangement is modified first, in that, the designed embodiment of the assembly with the two clutches B, E in connection with a changed activation means for the clutch E, and second also the spatial positioning of the brake A relative to the third planetary gearset RS3 and to the spur gear drive, i.e., spur gear stage STST.

As can be seen in FIG. 5, the assembly including two clutches B, E includes, unchanged, a common lamella-carrier ZYLBE for the two clutches B and E, a radial inner lamella-packet 200 with servo apparatus 210 of the clutch B, as well as a radial outer lamella-packet 500 with servo apparatus 510 of the clutch E. As in FIG. 3, the lamella-carrier ZYLBE serves as input element for both clutches B, E as well as the outer lamella-carrier for the clutch B and in inner lamella-carrier of the clutch E. As in FIG. 3, the outside lamellas of the lamella-packet 200 and in inner lamellas of the lamella-packet 500 are advantageously designed as steel lamellas. The inner lamellas of the lamella-packet 200 and the outer lamellas of the lamella-packet 500 are advantageously designed as covered or coated lamellas.

In this arrangement, the designed construction of the clutch B as the inner of the two clutches is taken over without change from FIG. 3. As a difference to the FIG. 3, the activation direction of the two servo apparatuses 210, 510, upon the closure of the respective lamella-packets 200, 500, is the same, the servo apparatus 510 activates the lamellas 500 now likewise in the direction of the first planetary gearset RS1. In this instance, are respectively the servo apparatuses 510, 210 as well as the lamella-packet 500, 200, when considered as to position, arranged at least considerably radially above each other. Correspondingly, the constructive formation of the lamella-carrier ZYLBE, as compared to FIG. 3, with special reference to the pressure chamber, i.e., the piston space of the servo apparatus 510 slightly modified, since this combination chamber/piston space is now placed on that side of the lamella-packet 500 which is proximal to the second planetary gearset RS2.

As may be further seen in FIG. 5, the brake A is now placed on that side of the first planetary gearset RS1 (of the spur gear stage STST), which is remote from the third planetary gearset RS3. Correspondingly the first spur gear STR1 borders now axially and directly on the third planetary gearset RS3 on than side thereof which is remote from the second planetary gearset RS2. In this arrangement, a hub STN1 of the first spur gear STR1 is supported on a transmission housing partition-wall GZ, which is located on that side of the spur gear STR1, which is remote from the planetary gearset and is, in an appropriate manner, bound to the transmission housing GG. In the example illustrated, the connection to the transmission housing by way of the partition-wall GW, which simultaneously forms a spur-sided outer wall of the transmission housing. As a matter of principle, it is possible that the transmission housing partition-wall GZ, in this location, can also serve as a kind of support plate for the reinforcement of the spur gear hub STN1.

The brake A (with lamella-packet 100 and servo apparatus 110) is, in regard to position, axially placed between the housing partition-wall GZ and the transmission housing wall GW. For example, the lamella-packet 100 borders the brake A axially at the transmission housing wall GW and the servo apparatus 110 of the brake A axially at the housing partition-wall GZ. Integrated in this example in the housing partition-wall GZ are pressure chamber/piston space, piston, and resetting means of the servo apparatuses 110. Upon appropriate application of pressure, the piston of the servo apparatus 110 activates the lamellas 100 axially in the direction to the spur gear STR1, that is to say, in the opposite direction from the planetary gearsets.

In another embodiment it is possible, for example, that provision can be made, that the lamella-packet 100 and the servo apparatus 110 assigned thereto, when seen in the axial direction, are otherwise arranged, the servo apparatus 110 in this case is then placed upon that side of the lamella-packet 100, which is remote from the spur gear STR1 for the activation of the brake A then axially in the direction of the spur gear STR1, i.e., of the planetary gearsets. Advantageously, in this case integrated in the housing (outer) wall GW are pressure chamber/piston space, piston, and reset element of the servo apparatus 110.

For a kinematic binding connection of the input element 120, which is serving as an inner lamella-carrier of the brake A on the sun gear SO3 of the third planetary gearset RS3 is provided a sun shaft SOW3, which co-axially extends itself along the input drive shaft AN from the sun gear SO3 to this inner lamella-carrier 120, with this arrangement, the first spur gear STR1 of the spur gear stage STST and the housing partition-wall GZ are centrally penetrated in the axial direction and supported on the input drive shaft AN.

Figure 6:
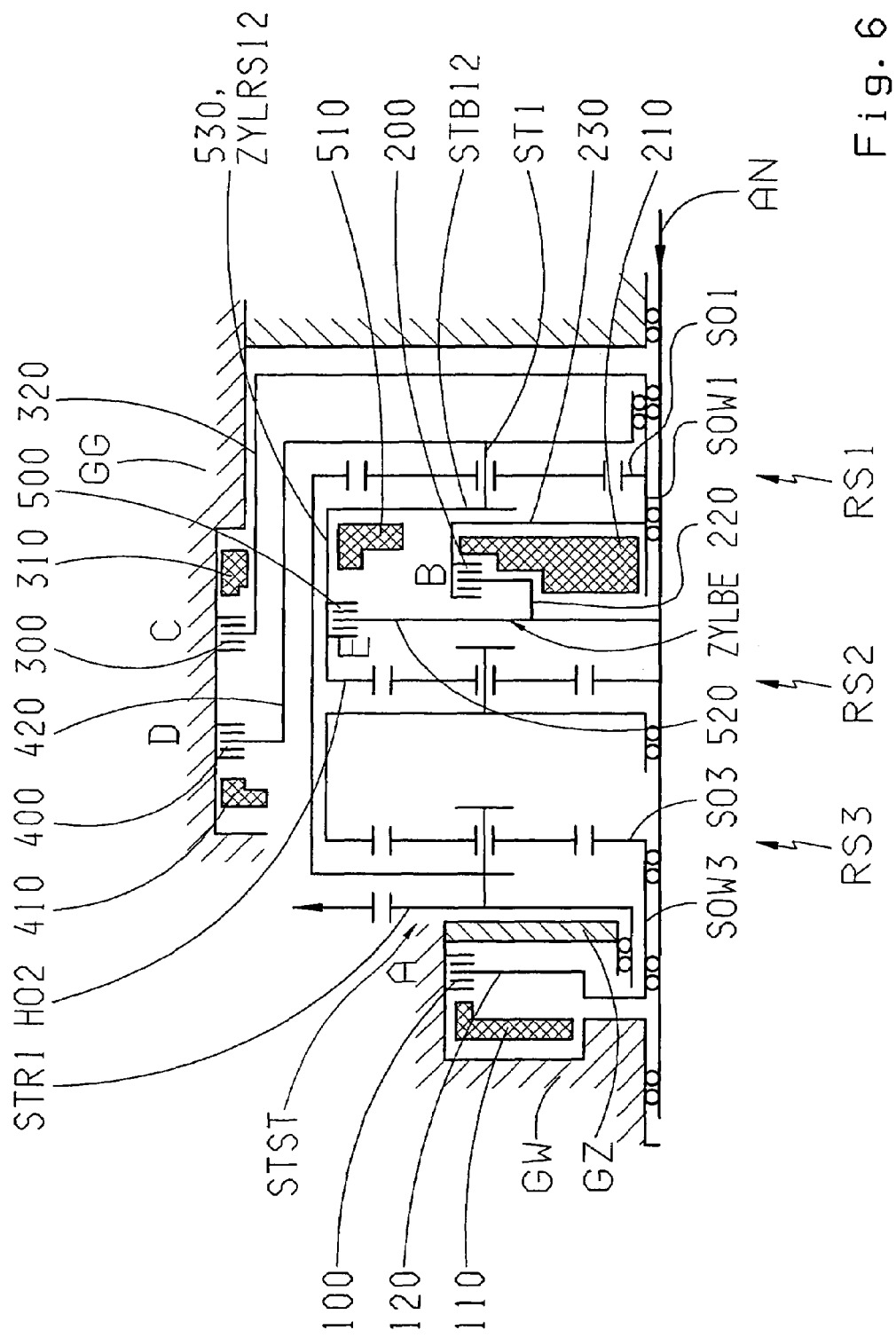
FIG. 6 is an example of a fourth schematic component arrangement in accord with the invention.

FIG. 6 now shows a fourth schematic component arrangement as an exemplary way of achieving the purpose of the invention. The principal modification in comparison to the previously described component arrangement shown in FIG. 3 to FIG. 5, concerns the designed embodiment of the component assembly with the two clutches B, E and the constructive embodiment of the assembly with the brake A on that side of the spur gear stage STST, which is remote from the planetary gears.

As can be inferred from FIG. 6, the assembly of the two clutches B, E incorporates the following: a lamella-carrier ZYLBE as a common inner lamella-carrier and an entry element 220, 520 for both clutches B and E, each an outer lamella-carrier as output element 230, 530 for the clutches B and E, a radial inner lamella-packet 200 with an assigned servo apparatus 210 of the clutch B as well as a radially outer lamella-packet 500 with corresponding servo apparatus 510 of the clutch E. Again as FIG. 6 shows, the outer lamellas of two lamella-packets 200, 500 are in this case, steel lamellas, whereas the inner lamellas of both lamella-packets 200, 500 are correspondingly covered or coated lamellas.

As a common entry element 220, 520, for both clutches B, E, the lamella-carrier ZYLBE is connected to the input drive shaft AN and extends itself in the radial direction parallel to the second planetary gearset RS2 and is axially directly binding on this.

The radial outer lamella-carrier of the clutch E, as the output element 530 of the same, is designed as a cylindrical ZYLRS12, which extends itself from the link piece STB12 (which is proximal to the second planetary gearset RS2) of the link ST1 of the first planetary gearset RS1 up to the internal gear HO2 of the second planetary gearset RS2, and is operationally bound to this link piece STB12 and this internal gear HO2 and which, on its cylindrical inner diameter possesses a characteristic, complementary structural shape for the acceptance of the outer lamella of the lamella-packet 500 of the clutch E. Within this cylinder ZYLRS12 is also placed the servo apparatus 510 of the clutch E which, as seen spatially axially between the lamella-packet 500 and the link piece STB12 for the activation of the lamella-packet 500 axially in the direction of the second planetary gearset RS2. Since the servo apparatus 510 continually rotates with a rotational speed of the link ST1 of the first planetary gearset RS1, it can be of advantage, if the servo apparatus 510 additionally also possesses a dynamic pressure compensation. The pressure medium feed to the pressure chamber of the servo apparatus 510 (and, if necessary, the lubricant feed to a pressure equalization space of the dynamic pressure compensation) can, for instance, be conducted over the link ST1 of the first planetary gearset RS1, the sun shaft SOW1 and the input drive shaft AN.

The radial inner outer lamella-carrier of the clutch B, serving as the output element 230 of the clutch, is designed as an uncovered pot, which opens in the direction of the second planetary gear drive RS2 and has a disk-like bottom across its inside diameter, with which bottom sun gear shaft SOW1 is bound. The sun gear shaft is further supported on the input drive shaft AN and is further connected to the sun gear SO1 of the first planetary gearset RS1. The output element 230 has a further cylindrical section, which connects itself to the outside diameter of the pot bottom and extends itself axially in the direction of the second planetary gearset RS2 and possesses on its inside diameter an appropriate structural complementary shape for the acceptance of the lamella-packets 200 of the clutch B. Within the cylinder space of this outer lamella-carrier 230, is also located the servo apparatus 210 of the clutch B, as to positioning, this is placed axially between the lamella-packet 200 and the pot bottom, for the activation of the lamella-packet 200 axially in the direction of the second planetary gearset RS2. The servo apparatus 210 can also possess a dynamic compensator. The pressure medium feed to the pressure chamber of the servo apparatus 210 (and, if necessary, the admission of the lubricating means to a pressure compensating space of the dynamic pressure compensation) can, for example, be conducted through the sun shaft SOW1 and the input drive shaft AN.

Limited by the conditions of this arrangement of the servo apparatuses 210 and 510, the lamella-carrier ZYLBE possesses in comparison to the previously described embodiments, a relative small axial extension along the axis.

As can further be seen in FIG. 6, the brake A, as in FIG. 5, is placed on that side of the first spur gear stage STST, which is remote from the third planetary gearset RS3 of the first spur gear STR1. As already noted within the framework of the description of FIG. 5, as a variation possibility, now the lamella-packet 100 axially borders onto the transmission partition-wall GZ, on which the spur gear STR1 is supported. The servo apparatus 110 of the brake A is now on that side of the lamella-packet 100 which is remote from the spur gear STR1 of the brake A and activates the lamella-packet 100, when it closes axially in the direction of the spur gear STR1, that is to say, in the direction of the third planetary gearset RS3. Integrated in the housing (outer wall) GW are space for pressure and piston movement, pressure medium feed line, piston and reset element of the servo apparatus 110, as well as an appropriate complementary structure shaping for the acceptance of the outer lamellas of the lamella-packet 100. In this way, a factory built, especially simple ready-build of the brake A as a component group is enabled. For the kinematic connection of the brake A to the third planetary gearset RS3, similar to that shown in FIG. 5, a sun shaft SOW3 is furnished, which is provided on the input drive shaft AN and which binds the entry element 120, which is serving as inner lamella-carrier to the brake A with the sun gear SO3 of the third planetary gearset RS3.

As may be seen additionally in FIG. 6, the spatial arrangement of the two further brakes C and D with their lamella-packets 300 and 400 and the servo apparatuses 310 and 410 assigned thereto are practically completely taken from FIG. 4.

Figure 7:
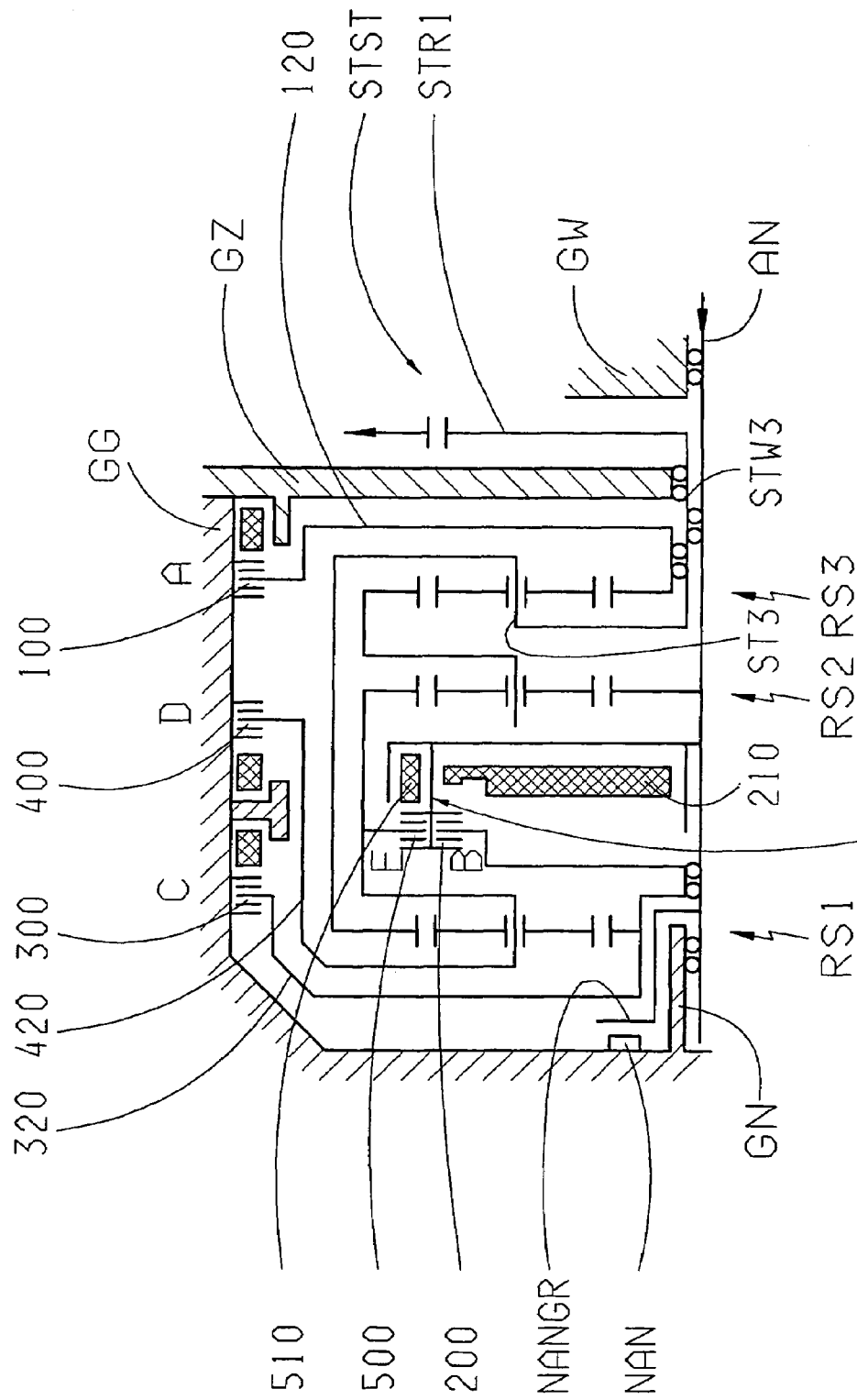
FIG. 7 is an example of a fifth schematic component arrangement in accord with the invention.

FIG. 7 now shows a fifth schematic component arrangement as an invented manner of achieving the purpose of the invention, this being based on the first component arrangement according with FIG. 3 and the third component arrangement as per FIG. 5. The modification in regard to the first component arrangement according with FIG. 3 concerns essentially the constructive assembly of the component group of the two clutches B and E, as well as the spatial position of the brakes C and D, relative to the planetary gearsets.

Ignoring for the moment, the mirror-image presentation of the transmission, it is easily seen in FIG. 7, that the assembly group of the two clutches B, E (including lamella-carrier ZYLBE), the lamella-packets 200 and 500, as well as the servo apparatuses 210 and 510 were taken out of the arrangement of FIG. 5.

As may be seen further in FIG. 7, the two neighboring brakes C and D, as compared to FIG. 3, are pushed in an axial direction, so that now, the brake C, as to its spatial accommodation, is placed in an area radially located above the first planetary gearset RS1 and the brake D, which is neighboring to brake C, is placed in an area radially located with respect to being above the clutch E. Indicated is a slanting of the transmission housing GG in the area of the housing outside diameter on that side of the automatic transmission situated opposite to the spur gearing. A similar reduction in diameter can, for example, is necessary due to an actually available transmission installation space. The inner lamella-carrier 320, 420 of both brakes C, D are, as is necessitated by their structure, compliant with the narrowing of the transmission housing GG.

As a further detail modification, in FIG. 7 is presented a changed support of the first spur gear STR1 of the spur gear stage STST. Axially between the expanded entry element 120 of the brake A, which element is serving as an inner lamella-carrier and the spur gear stage STST is now provided a housing partition-wall GZ, by appropriate way with the transmission housing GG, which extends itself radially from the transmission housing outside diameter to the inside up to the link piece STW3, by way of which the link ST3 of the third planetary gearset RS3 is bound to the first spur gear STR1 of the spur gear stage STST. In this arrangement the link shaft STW3, for example, is supported on the input shaft AN. Different from FIG. 3, the first spur gear STR1 is now mounted on the housing partition-wall GZ and not on the outer end wall GW of the transmission housing.

As an additional detail, in FIG. 7 is presented an apparatus for the measurement of the speed of rotation of the input drive shaft AN. The corresponding input drive shaft speed of rotation sensor is designated as NAN, is placed on an outside end wall of the transmission housing GG and is accordingly easily accessible in that location. In this case, the location is, for example, on that side of the transmission which is opposite to the spur gear stage STST. Corresponding to the embodiment example of being used as an axial contacting sensor, this input speed of rotation sensor NAN, as to position, is placed in the area of the hub GN which is affixed to the transmission housing and reacts to a signaling wheel NANGR, which wheel is slip-free attached to the input drive shaft AN, the contact point being, for example, by the inductive or the Hall-measuring principle.

Figure 8:
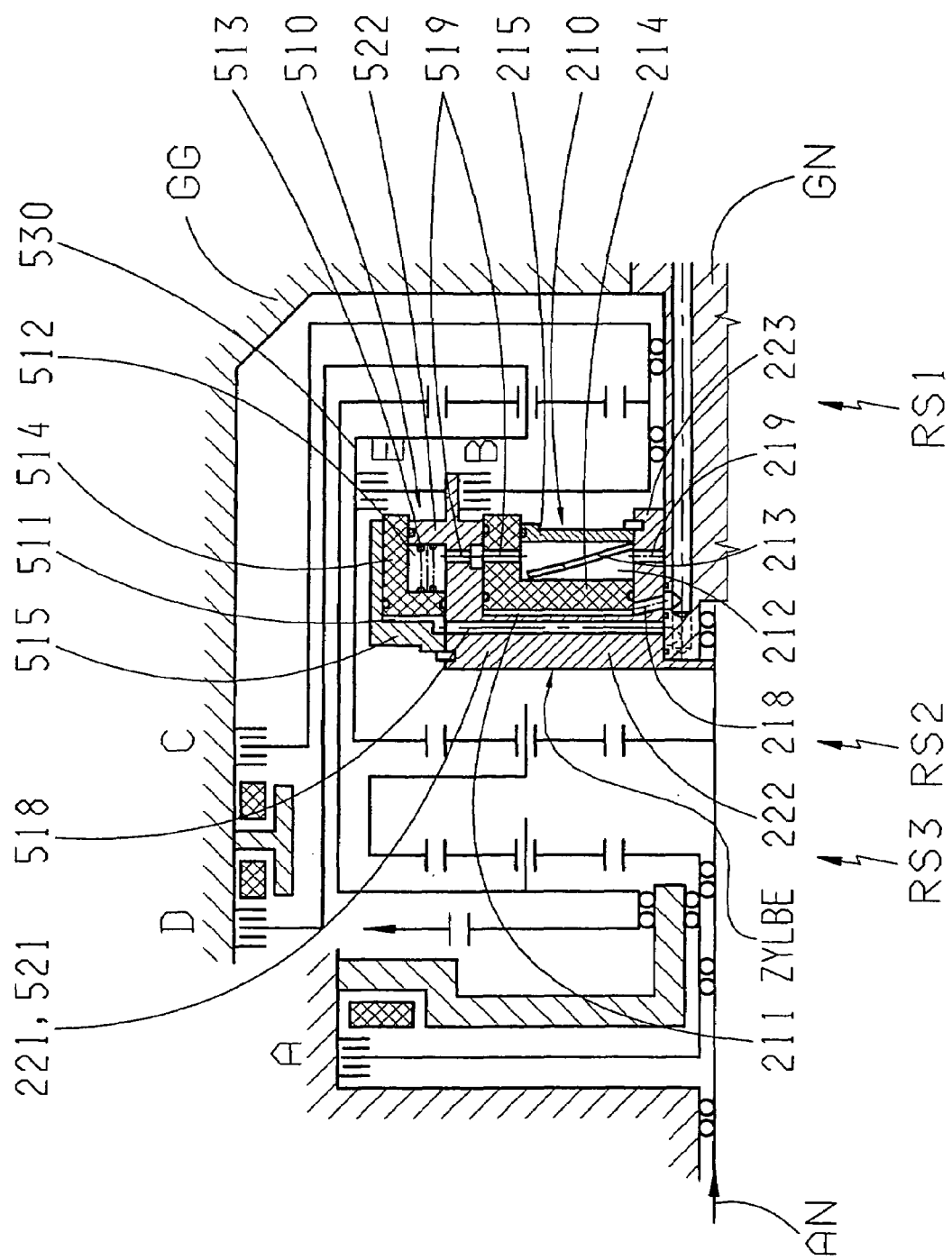
FIG. 8 is an example of a sixth schematic component arrangement in accord with the invention.

FIG. 8 now shows a sixth schematic component arrangement as an example of achieving the purpose of the invention. In this arrangement this sixth invented component arrangement is an extension of the previously described component arrangement as seen in FIG. 5 and primarily concerns the arrangement and the formation of the pressure chamber and the pressure compensation space of both servo apparatuses of the component assembly with the two clutches B and E.

As may be seen in FIG. 8, without change, for both clutches B and E, a common lamella-carrier ZYLBE is provided, which serves clutch B as an outer lamella-carrier and performs for the clutch E the functions of an inner lamella-carrier. Likewise unchanged, both lamella-packets 200, 500 of the clutches B, E, upon which that side of the lamella-carrier ZYLBE. Which is proximal to the first planetary gearset RS1 and are activated axially in the direction of the planetary gearset RS1 by way of respective servo apparatus 210 and 510 of the clutch B or E upon the closure of the said clutch. When this occurs, the lamella-packet 500 is to be seen located radially above the lamella-packet 200. Both servo apparatuses 210, 510 possess respectively a dynamic pressure compensation device.

Geometrically, for the clutches B, E, the common lamella-carrier ZYLBE is subdivided into sections 223, 222, 221, 521 and 522. The hub 223, the disk-like section 222 and the cylindrical section 221 are assigned to the entry element of the radial inner clutch B, the cylindrical section 521 and the disk-like section 522 are assigned to the input element of the radial outer clutch E. These will be clarified by the chosen nomenclature.

The hub 223 of the lamella-carrier ZYLBE is connected to the input drive shaft AN by way of a specialized operational binding, for example, this connection being by means of a complementary structural receiver. In the presented image seen in FIG. 8, the hub 223 is supported, in turn, on another hub GN, which latter is rigidly affixed to the transmission housing. The hub GN also extends itself—starting from that outer end-wall of the transmission housing GG, which is on that side of the first planetary gearset RS1 which is remote from the clutch—by running axially until below the lamella-carrier ZYLBE (and simultaneously, the first planetary gearset RS1 centrally penetrates and centrally engages itself within the inside diameter of the hub 223 of the lamella-carrier ZYLBE in an axial direction).

On the side of the hub 223, which is remote from the planetary gearset RS1, the disk-like section 222 attaches itself to the hub 223 and extends itself radially outward up to a diameter, which corresponds to a dimension somewhat greater than the outside diameter of the lamella-packet 200 of the (radial inner) clutch B. The cylindrical section 221 clamps onto the outer diameter of the disk-like section 222 and extends itself in the axial direction to a point above the lamella-packet 200 of the clutch B, this being relatively close to the first planetary gearset RS1. In the area close to the neighboring planetary gearset RS1, the cylindrical section 221 possesses on its inside diameter a complementary structural configuration for the acceptance of the outer lamellas of the lamella-packet 200. As made evident in FIG. 8, these outside lamellas are advantageously constructed of steel. The cylindrical section 221 and the disk-like section 222 of the lamella-carrier ZYLBE create a clutch space, within which the lamellas 200 and the servo apparatus 210 of the clutch B can be placed, the placement being radially above the hub 223 of the lamella-carrier ZYLBE. The servo apparatus 210 encompasses a pressure chamber 211, a piston 214, a resetting plate spring 213, a pressure compensation space 212 and a seal-plate 215. The pressure chamber 211 is, in this arrangement, formed by the sections 221, 222 and 223 of the lamella-carrier ZYLBE and a piston 214, a pressure compensation space 212 for the evening out of dynamic pressure variations of the clutch B is formed through the piston 214 and the seal-plate 215. The pressure compensation space 212 of the servo apparatus 210 is also placed closer to the first planetary gearset RS1 than is a pressure chamber 211 of the servo apparatus 210.

A pressurized media feed conduit, designated with 218, runs to the pressure chamber 211 of the servo apparatus 210 of the radial inner clutch E, shown here as an inclined radial boring through the hub 223 of the lamella-carrier ZYLBE. This radial boring 218 feeds the pressurized media required to actuate the clutch B by way of the hub GN, which is rigidly affixed to the transmission housing and on which the hub 223 of the lamella-carrier ZYLBE is supported, as has already been described. Accordingly, the adapted hub GN is furnished with completed conduit openings for pressurized media. In another embodiment, it is possible that the pressurized media can enter the pressure chamber 211 of the servo apparatus 210 also through corresponding axial and radially borings of the input drive shaft AN.

A lubricating inlet 219 for the pressure compensation space 212 of the servo apparatus 210 of the radial inner clutch E runs, in this embodiment, as a straight radial boring, likewise through the hub 223 of the lamella-carrier ZYLBE. To this radial boring 219 is fed the non-pressurized lubricant used for the filling of the pressure compensation space 212 by way of the transmission housing hub GN.

The cylindrical section 521 of the lamella-carrier ZYLBE (which is associated with the radial outer clutch E), represents in principle, the cylindrical section 221 (which is associated with the radial inner clutch B). On its side, which is proximal to the first planetary gearset RS1, the cylindrical section 521 on its outside diameter a complementary profile for the acceptance of the inner lamellas of the lamella-packet 200 of the clutch B. As indicated in FIG. 8, these inner lamellas are advantageously designed as being coated or covered. Axially beside this lamella-complementary structure members, on that side of the lamella-complementary member, which is proximal to the planetary gearset RS1, the disk-shaped section 522 of the lamella-carrier ZYLBE connects itself to the cylindrical section 521 and extends itself—starting at the outside diameter of the cylindrical section 521—radially outward up to a diameter, which, advantageously, is smaller than the average diameter of the outer lamellas of the lamella-packet 500 of the radial outer clutch E.

The servo apparatus 510 of the (radial outer) clutch E, as to positioning, can be seen as placed radially above the cylindrical section 521 of the lamella-carrier ZYLBE. For the formation of a piston, better said, a pressure chamber 511 accommodating the piston, and thereto a pressure compensation space 512, of this servo apparatus 510, a cylindrical support disk 515 is provided which, as to position, is placed radially above the cylindrical section 521 of the lamella-carrier ZYLBE. In this arrangement, this support disk 515 possesses a disk-like section, the inside diameter of which, in the area of the axially outer edge of the cylindrical section 521, which is proximal to the second planetary gearset RS2, is force fit onto this cylindrical section 521 of the lamella-carrier ZYLBE, is secured axially in this area onto the cylindrical section 521 and consequently also provided with high pressure medium sealant to the cylindrical section 521. On the outside diameter of the disk-like section of the support disk 515, a cylindrical section attaches itself. This cylindrical section runs axially in the direction of the lamella-packet 500, that is to say, extends axially in the direction of the first planetary gearset RS1. The cylinder shaped support disk 515 and the cylindrical section 521 of the lamella-carrier ZYLBE for a piston-pressure chamber system 514, 511 of the servo apparatus 510, within which a piston 514 of the servo apparatus 510 is arranged to be slidable in the axial direction. The piston 514 is then, in this arrangement, axial movable and sealed against high pressure medium against the cylindrical section of the support disk 515 as well as against the cylindrical section 521 of the lamella-carrier ZYLBE. The piston 514 of the servo apparatus 510 is—similar to the support disk—designed as an open cylinder 515, opening in the direction of the lamella-packet 500, wherein the cylinder bottom forms the separation wall to the pressure chamber 511. The surrounding circumferential surface of the piston 514 encompasses the disk-shaped section 522 of the lamella-carrier ZYLBE and extends itself in the axial direction up to the lamella-packet 500 of the clutch E. Between the cylinder bottom of the piston 514 and the disk-like section 522 of the lamella-carrier ZYLBE is inserted a retraction element 513 of the servo apparatus 510, in this case being a ring-shaped packet with parallel installed helical springs.

A pressure medium feed system 518 to the pressure chamber 511 of the servo apparatus 510 of the radial outer clutch E runs sectionally as a radial boring through a disk-like section 222 and through the hub 223 of the lamella-carrier ZYLBE. The pressure medium for the activation of the clutch E can, for example, be conducted from the input drive shaft AN, whereby the drive shaft AN then correspondingly must possess radial and axial borings. Alternative to this, the pressure medium for the activation of the clutch E of this radial boring 518, however, can be fed in by way of the transmission housing affixed hub GN on which, in this case, the lamella-carrier ZYLBE and the input drive shaft AN are supported, whereby the hub GN then accordingly possesses the required pressure medium conduit borings.

For the formation of a pressure compensation space 512 for the evening out of the dynamic pressure of the servo apparatus 510, the cylindrical outer circumference of the piston 514 is sealed off against the disk-shaped section 522 of the lamella-carrier ZYLBE to present the passage of lubricant materials. Correspondingly, the pressure compensation space 512 is formed by the disk-like section 522 and cylindrical section 521 of the lamella-carrier and the piston 514. The pressure compensation space 522 is formed by the cylindrical section 521 of the lamella-carrier ZYLBE and the piston 514.

This pressure compensation space 512 of the radial outer clutch E is filled with a lubricant, but not under pressure, from the pressure compensation space 212 of the radial inner clutch B. In this case, not only in the cylindrical section 521 (or 221), of the lamella-carrier ZYLBE, but as well as in the piston 214 of the servo apparatus 210 of the clutch B, radial borings are provided, which open into the pressure compensation space 212, 512. A corresponding lubrication feed is designated as 519.

One can also infer from FIG. 8, that the servo apparatus 510 of the clutch E, positionally, is placed radially above the servo apparatus 210 of the clutch B, whereby respectively the two pressure spaces 211 and 511, respectively the two pressure compensation spaces 212 and 512 and respectively also a resetting device 213, 513 are to be found somewhat radially placed above one another. The section of the outer circumference of the common lamella-carrier ZYLBE serving both clutches B, E, and which separate from one another the two pressure chambers 211, 511, that is to say, the two pressure compensation spaces 212, 512, is also principally the cylindrical section 221 (or 521) of the common lamella-carrier ZYLBE for both clutches B, E.

With the assistance of the FIGS. 9 to 11, in the following, three further invented component arrangements will be explained in detail, wherein—showing a difference to the previously presented six invented component arrangements—the axial set component assemblies located between the first planetary gearset RS1 and the second planetary gearset RS2 of the two clutches B, E now possess in axial alignment, lamella-packets 200, 500 located next to one another. As a result from this arrangement, it is possible in an advantageous manner, to provide the two said lamella-packets 200, 500 with a comparatively large diameter, which is in character with their high thermal loading. Bearing in mind the constructive embodiment of this component assembly, also reference will be given to the not yet disclosed patent text, bearing the same date of application as the present German Patent Application, which has already been submitted, the undisclosed patent text is given the internal file number ZF 8818 S—PCT/EP2004/011030—the descriptive content of which is to be likewise an object of the present application.

Figure 9:
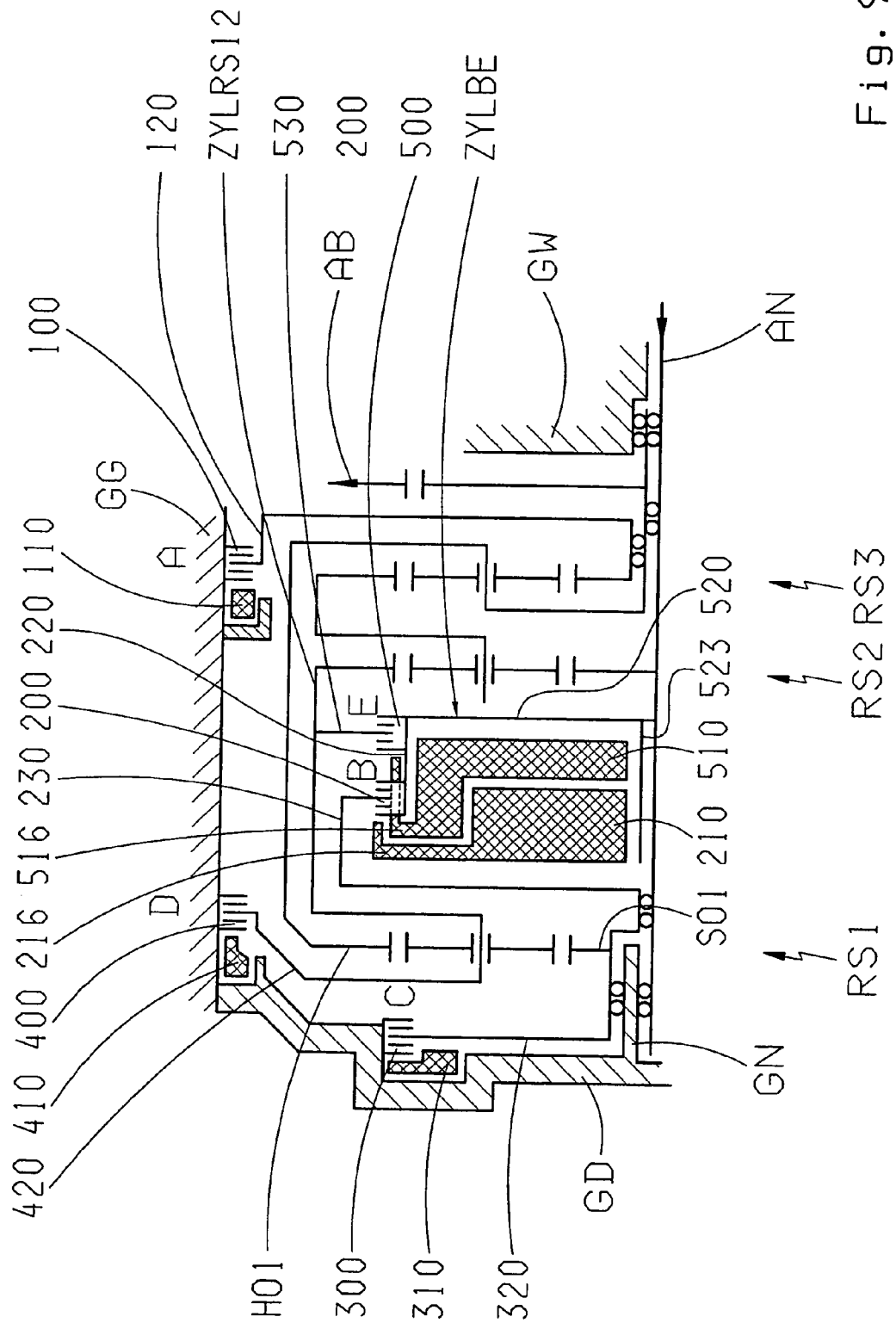
FIG. 9 is an example of a seventh schematic component arrangement in accord with the invention.

FIG. 9 now shows a seventh schematic component arrangement as an exemplary, invented manner of achieving the purpose of the invention. The depicted assembly of FIG. 9 will base itself on the first invented component assembly according with FIG. 3. As already mentioned, the two clutches B, E form a component group, now with axially, successively neighboring lamella-packets 200 and 500, whereby this grouped assembly, when seen as to position, is found, without change, axially located between the two planetary gearsets RS1 and RS2.

Similar to the case of FIG. 3, also, in accord with FIG. 9 for both couplings B, E is provided a common lamella-carrier ZYLBE, which the carrier is designed as an pot, which is open in the direction of the first planetary gearset RS1 and is bound to the input drive shaft AN. As a difference from FIG. 3, the lamella-carrier ZYLBE now forms the inner lamella-carrier for both clutches B and E and possesses in this respect, on its outside diameter an appropriate complementary structural configuration for the acceptance of the inner lamellas of both lamella-packets 200 and 500. As is depicted in FIG. 9, these inner lamellas are made, advantageously, of steel and the outer lamellas of the lamella-packet 200 and 500 correspondingly serve as lamellas with a coating or cover. The lamella-packet 500 of the clutch E is placed proximal to the second planetary gearset RS2, the lamella-packet 200 of the clutch B is found on that side of the lamella-packet 500 which side is opposite to the second planetary gearset RS2 and near to the first planetary gearset RS1. The disk-shaped pot bottom of the lamella-carrier ZYLBE and the first cylindrical section which attached itself to the outside diameter of this pot bottom with the lamella-disposed, complementary structural configuration for the inner lamellas of the clutch E can be understood as serving as input elements 520 of the clutch E. Correspondingly, it is possible that the second cylindrical section with the lamella-disposed, complementary structural configuration for the inner lamellas of the clutch B, which connects itself onto the first cylindrical section with the lamella-disposed, complementary structural configuration for the inner lamellas of the clutch E, acts axially in the direction of the first planetary gearset RS1 and can be understood as entry element 220 of the clutch B. The entry element 220 of the clutch B is, accordingly, bound by way of the entry element 520 of the clutch E to the input drive shaft AN.

As may be seen in FIG. 9, the lamella-carrier ZYLBE, common for both clutches B, E, for example, possesses a cylindrical hub 523 in the diameter area of the input drive shaft AN, which the hub, with appropriate means, is bound to the input drive shaft AN with the capability of turning therewith. This hub 523 extends itself axially, starting from the disk-shaped pot bottom of the lamella-carrier ZYLBE in the direction of the first planetary gearset RS1. As to position, radially above this hub 523 are placed the servo apparatuses 510, 210 of both clutches E, B, whereby a plurality of parts of these two servo apparatuses 510, 210 are placed within the cylinder space, which has been formed by lamella-complementary structural configurations of the lamella-carrier ZYLBE. With this arrangement, the servo apparatus 510 of the clutch E is closer to the second planetary gearset RS2 than is the servo apparatus 210 of the clutch B and borders both axially directly on the disk-like pot bottom of the lamella-carrier ZYLBE as well as radially on the cylindrical section of the lamella-carrier ZYLBE underneath its lamella-complementary structural configurations. For the activation of the lamella-packet 500 axially in the direction of the second planetary gearset RS2, the servo apparatus 510 possesses advantageously, at least three activation fingers 516, which seize the cylindrical section of the lamella-carrier ZYLBE with the lamella-complementary structural configuration for the inner lamella of the lamella-packet 200, in axial and radial direction, as this is carried out, then the lamella-packet 200 or the lamella-complementary structural configuration of the lamella-carrier ZYLBE assigned to this lamella-packet 200, fully engage, and act upon the lamella-packet 500 from that side of the second planetary gearset RS2, which is opposite to the lamella-packet 500.

Correspondingly, the servo apparatus 210 of the clutch B, as to location, is placed beside the servo apparatus 510 of the clutch E on that side of the of this servo apparatus 510, which is proximal to the first planetary gearset RS1. For the activation of the lamella-packet 200, axially in the direction of the second planetary gearset RS2, the servo apparatus 210 possesses an annular pressure plate 216, which completely encompasses the activation finger 516 of the servo apparatus 510 in the radial direction and partially encompasses the same in the axial direction and acts upon the lamella-packet 200 from that side of said lamella-packet 200 which is lies opposite to the secondary gearset RS2.

For the purpose of restricting axial construction length, it is possible, that in a different embodiment provision can be made, that instead of an annular plate 216 of the servo apparatus 210 a single activation finger can be used, which, as to position, would be inserted axially in the activation fingers 516 of the servo apparatuses 210, 510.

Corresponding to the design of the lamella-carrier ZYLBE as an inner lamella-carrier for both the clutch B, E, is both that exit elements 230 of the coupling B and that the output element 530 of the clutch E is designed for serving as outer lamella-carrier for the acceptance of the outside lamellas of the respective lamella-packet 200, 500. In this case, these outside lamellas (as already mentioned) are advantageously constructed as coated or covered lamellas. Geometrically, the output element 230 of the clutch B possesses the shape of a pot, which is open in the direction of the second planetary gearset RS2, with a cylindrical section, a disk-like pot bottom and a hub. The disk-like pot bottom of the output element 230 is placed axially directly between the first planetary gearset RS1 and the servo apparatus 210 of the clutch B. The hub of the output element 230 attaches itself to pot bottom on the inner diameter and extends itself axial in the direction of the first planetary gearset RS1 and by way of an appropriate operational connection, for instance, by means of a welded jointing or a complementary structural configuration, is bound with the sun gear SO1 of the first planetary gearset RS1. The cylindrical section of the output element 230 attaches itself to the pot bottom, specifically onto the outside diameter of this, extends itself axial in the direction of the second planetary gearset RS2 up to above the lamella-packet 200 of the clutch B and possesses on its inside diameter a characteristic complementary structural configuration for the acceptance of the outside lamellas of this lamella-packet 200. The geometric design of this output element 530 of the clutch E represents, in principal, that design already described and explained in FIG. 3, whereby the cylinder ZYLRS12, as in FIG. 3, forms the operational connection between the link ST1 of the first planetary gearset RS1 and the internal gear HO2 of the second planetary gearset RS2 and the outer lamellas of the lamella-packet 500 of clutch E, at the same time the cylindrical output element 230 of the coupling B spreads.

As again to be seen in FIG. 9, the lamella-packet 100 of the brake A, as in FIG. 3, as to location, is to be found at least somewhat radially above the third planetary gearset RS3 in the area of the large diameter of the cylindrical transmission housing GG. The servo apparatus 110 of the brake A, however, is now so located, that it is placed somewhat radial over the second (middle) planetary gearset RS2 and activates the lamellas 100 upon the closure of the brake A axially in counter direction to the first planetary gearset RS1.

Furthermore, in FIG. 9 the brake D with its lamella-packet 400 and its servo apparatus 410, for example, is located in an area somewhat radially above the first planet gearset RS1 at the large inside diameter of the cylindrical transmission housing GG. The servo apparatus 410 of the brake D is, in this case, in the housing cover GD, which forms the output or the end drive of the transmission and by appropriate means binds to the transmission housing GG in a turning secured manner, and integrates and activates the lamellas 400 upon the engagement of the brake D axially in the direction of the third planetary gearset RS3.

The brake C with its lamella-packet 300 and its servo apparatus 310 is now axially located beside the first planetary gearset RS1 upon that side, remote from the placement of the clutch B, i.e., of the other two planetary gearsets RS2, RS3, whereby the brake C is now directly between the first planetary gearset RS1 and the housing cover GD on a diameter which, to some extent, represents that of the interior gear HO1 of the first planetary gearset RS1. Under this circumstance, the housing cover GD serves in an advantageous manner a the outside lamella-carrier of the brake C for the acceptance of the outside lamella of the lamella-packet 300. Beyond this, the servo apparatus 310 of the brake C is integrated into this housing cover GD and activates the lamellas 300 upon the engagement of the brake C axially in the direction of the first planetary gearset RS1. The activation directions of all three brakes C, D and A are the same in this embodiment example.

As is in FIG. 3, so also in FIG. 9, the input drive shaft AN is supported on the housing cover GD. As a difference to FIG. 3, the housing cover GD possesses a housing cover affixed, housing secured, tubular hub GN, which extends itself into the inner space of the transmission housing GG. The input shaft AN is supported on an inner diameter of this hub GN. On an on a diameter greater than this hub GN, is supported the designed entry element 320 of the brake C. This designed entry element 320 is bound to the sun shaft SO1 of the first planetary gear drive RS1 and supported as a inner lamella-carrier serving as an entry element 320 of the brake C.

Figure 10:
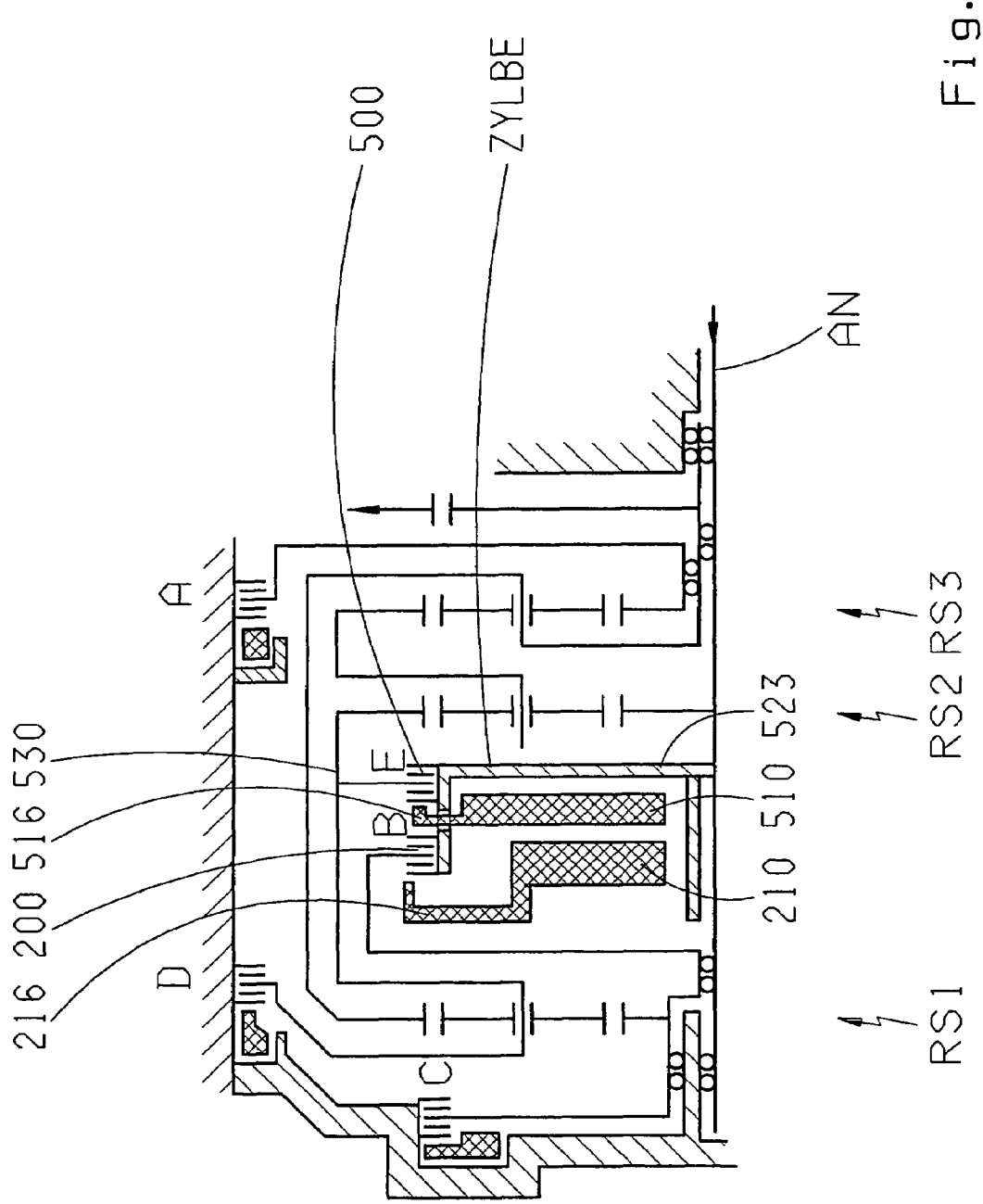
FIG. 10 is an example of an eighth schematic component arrangement in accord with the invention.

FIG. 10 shows now an eighth schematic component arrangement as an exemplary invented way for the achievement of the purpose of the invention. Being based on the previously described FIG. 9, seven invented component arrangements have been explained. The difference to the seventh component assembly as per FIG. 9 concerns, essentially the constructive embodiment of the servo apparatus 510 of the clutch E, upon unchanged activation direction. As in FIG. 9, this servo apparatus 510, as to location, is placed radially above the hub 523 of the common lamella-carrier ZYLBE for both clutches B, E, and axially borders on the disk-shaped section, namely the "pot bottom" of this carrier ZYLBE. Generally, the servo apparatus 510, in this arrangement placed radially within the clutch space, which is formed by the cylindrical section of the lamella-carrier ZYLBE with the lamella-complementary structural configuration of the lamella-packet 500 of the clutch E. As a difference to FIG. 9, the lamella-carrier ZYLBE on its radial, outer cylinder, in an area between the two lamella-packets 200 and 500, advantageously possesses at least three penetrations, symmetrically apportioned about the circumference. Each of these penetrations, is respectively assigned to an activation finger 516 of the servo apparatus 510. The penetrations possess, respectively, a very large axial extension, so that this activation finger 516, first, can reach through the penetrations radially and second, can establish an axial hub for the activation of the lamella-packet 500 upon the closing of the clutch. The activation fingers 516 act, as in FIG. 9 on the lamella-packets 500, which are proximal to the lamella-packet 200 of the clutch B, i.e., proximal to the first planetary gearset RS1.

The servo apparatus 210 of the clutch B is located axially beside the servo apparatus 510 of the clutch E, on that side of the servo apparatus 510 which is proximal to the first planetary gearset RS1. The annular pressure plate 216 of the servo apparatus 210 encompasses the lamella-complementary structural configuration of the lamella-carrier ZYLBE for the inner lamellas of the lamella-packet 200 in radial and axial directions and act upon the surface of the lamella-packet 200, which is proximal to the first planetary gearset RS1.

Figure 11:
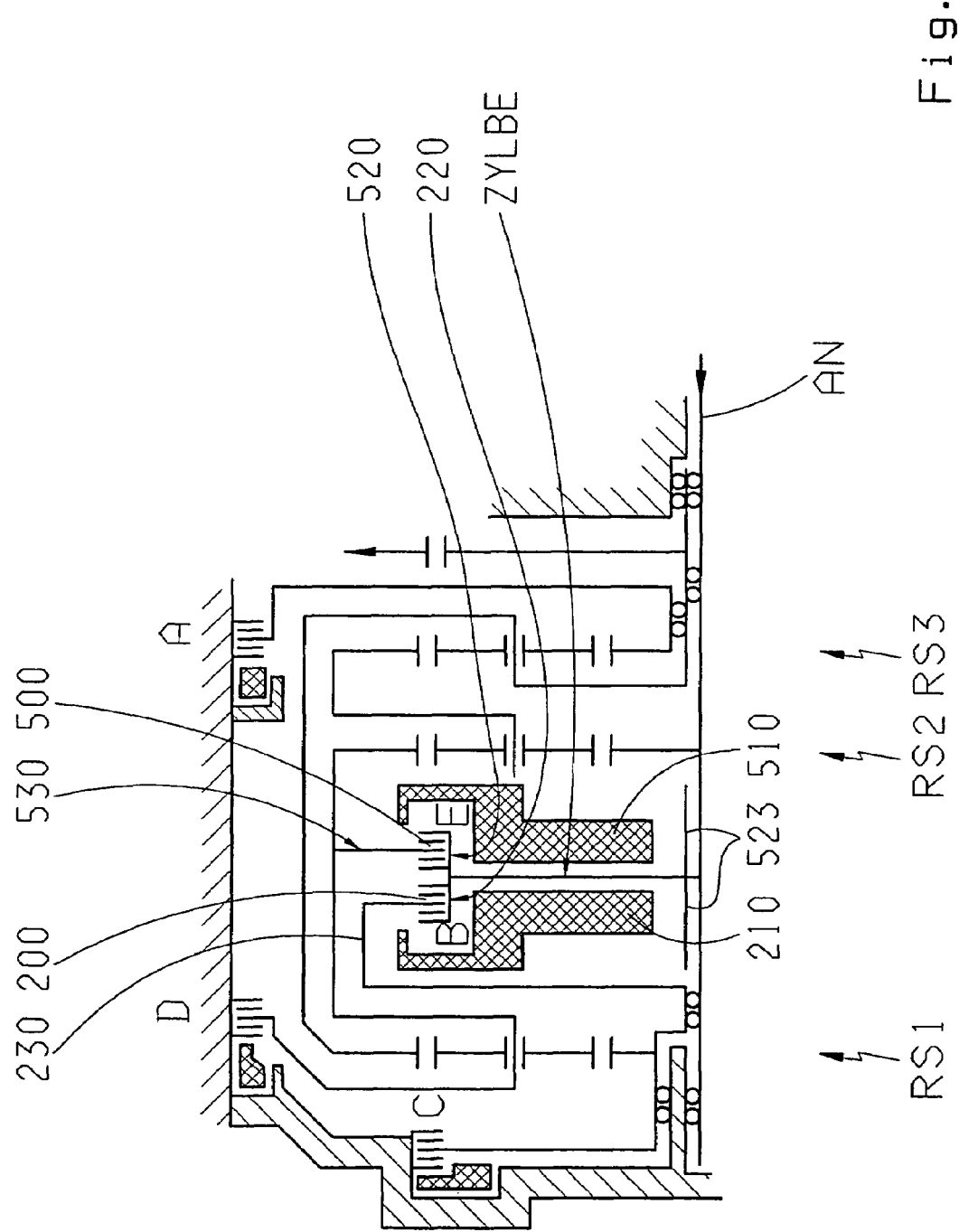
FIG. 11 is an example of a ninth schematic component arrangement in accord with the invention

FIG. 11 shows a ninth schematic component arrangement as an exemplary manner of achieving the purpose of the invention. This is, likewise, based on the previously described FIG. 9 in the details explained seven invented component arrangements. The difference to seven component arrangements in accord with FIG. 9 concerns in essence, the constructive embodiment of the common lamella-carrier ZYLBE for the two clutches B, E and the servo apparatus 210, 510 of these clutches B, E.

The lamella-carrier ZYLBE is designed to be used for both clutches B and E as an inner lamella-carrier and forms for both clutches B, E, their input element 220, 520 and is correspondingly the kinematic clutch of the transmission scheme and is accordingly bound to the input drive shaft AN. On its outside diameter, the lamella-carrier ZYLBE possesses a characteristic complementary structural configuration for the acceptance of the inner lamellas of both lamella-packets 200 and 500, whereby these inner lamellas, in this condition, advantageously are steel lamellas and the outer lamellas of the lamella-packets 200 and 500 are correspondingly made as covered or coated lamellas. As shown in FIG. 9, the lamella-packet 500 of the clutch E is placed close to the second planetary gearset RS2, the lamella-packet 200 of the clutch B is placed correspondingly on that side of the lamella-packet 500, which is opposite to the second planetary gearset RS2, and the lamella-packet 200 is further close to the first planetary gearset RS1. The section of the cylindrical lamella-carrier ZYLBE with the lamella-complementary profile for the inner lamellas of the lamella-packet 200 is also assigned to the input element 220 of the clutch B, the section of the cylindrical lamella-carrier ZYLBE with the complementary lamella-complementary structural configuration for the inner lamellas of the lamella-packet 500 to the input element 520 of the clutch E.

Differing from FIG. 9, the cylindrical lamella-carrier ZYLBE possesses now a disk-shaped section, which extends itself somewhat centrally under the cylindrical section of the lamella carrier ZYLBE—considered as to location, approximately between the lamella-complementary structural configuration for the inner lamellas of the lamella-packet 200 and the lamella-complementary structural configuration for the inner lamellas of the lamella-packet 500—toward the inside up to the hub 523 of the lamella-carrier ZYLBE. This hub 523, in turn, is bound to the input drive shaft AN, extending itself conversely to FIG. 9, but now in the axial direction on both sides of the disk-shaped section of the lamella-carrier ZYLBE, thus proceeding outward from the central, disk-like section of the lamella-carrier ZYLBE to a spatial position underneath the lamella-carrier ZYLBE to a spatial position underneath the lamella packet 200 of the clutch B, axially in the direction of the first planetary gearset RS1, to another, again spatially positioned underneath the lamella-packet 500 of the clutch E, axially in direction of the second planetary gearset RS2.

A servo apparatus 210 of the clutch B is axially placed on that side of the disk-shaped section of the lamella-carrier ZYLBE, which side is proximal to the first planetary gearset RS1. Also, this servo apparatus 210, as to location, is above the hub section of the hub 523, which is proximal to the first planetary gearset RS1, and which hub 523 is placed in the lamella-carrier ZYLBE, at least mostly within the clutch space, which is formed by the lamella-packet 200 of the clutch B and the disk-like section of the lamella-carrier ZYLBE. With this arrangement, the servo apparatus 210 borders directly on this disk-like section and also on the cylindrical section of the lamella-carrier ZYLBE with the lamella-complementary structural configuration for the inner lamellas of the lamella-packet 200.

For the activation of the lamella-packet 200, to move the clutch B, axially in the direction of the second planetary gearset RS2, the servo apparatus 210 advantageously possesses at least three activation fingers 216, which encapsulate the cylindrical section of the lamella-carrier ZYLBE with the lamella-complementary structural configuration for the inner lamellas of the lamella-packet 200 in radial and axial direction and act upon the end surface of the lamella packet 200, to which the first planetary gearset RS1 is proximal.

A servo apparatus 510 of the clutch E is placed axially on that side of the disk-shaped section of the lamella-carrier ZYLBE, which is proximal to the second planetary gearset RS2. Also, this servo apparatus 510, considered as to position, is above that hub section of the hub 523 of lamella-carrier ZYLBE and which hub section is proximal to the second planetary gearset RS2. The servo apparatus 510 is at least nearly completely within the clutch space, which is formed by the lamella-packet 500 of the clutch E and the disk-shaped section of the lamella-carrier ZYLBE. In this arrangement, the servo apparatus 510 borders directly on this disk-shaped section and also on the cylindrical section of the lamella carrier ZYLBE with the lamella-complementary structural configuration 500. For the activation of the lamella-packet 500 of the clutch E axially in the direction of the first planetary gearset RS1, the servo apparatus 510 possesses, advantageously, at least three activation fingers 516, which grasp the cylindrical section of the lamella carrier ZYLBE with the lamella-complementary, structural configuration for the inner lamellas of the lamella-packet 500 in a radial and axial direction and act upon the end face of the lamella-packet 500, which is turned to face the second planetary gearset RS2.

In another embodiment, it is possible, that instead of the activation fingers 216 and/or 516 of the servo apparatus 210, 510 also an annular pressure plate can be provided.

The design of the output element 230 of the clutch B, the output element 530 of the clutch E, respectively, as an outside lamella-carrier for the acceptance of the—advantageously as covered/coated lamellas—outside lamellas of the respective lamella-packet 200, 500, and also the design and arrangement of the remaining components presented in FIG. 11, as am exemplary, ninth, invented component arrangement was taken over from FIG. 9.

As already mentioned, some component constructions of all nine invented component arrangements are to be regarded as examples. For the saving of axial lengths of the automatic transmission, for example, the expert, because of need, could replace the spur gear drive in the FIGS. 3 to 11 even with a chain drive. In accord with the situation regarding installation and input drive string configurations, the expert would, by all proposed and nine invented component arrangements, combine by choice, with one for input drive shaft axis parallel output drive shaft or with a non-right angled spur gear drive (Beveloid-Spur Gear Drive) or a (right angled or not right angled) bevel gear system. Because the input drive gear penetrates the entire transmission in axial direction throughout its entire length, the expert can rebuild the proposed nine invented component arrangements without difficulty for an application of input and output driving shafts, which would be co-axial to one another.

The presented nine schematic component arrangements presented in FIG. 3 to FIG. 11, are generally based on lamella-brakes as a constructive means for the shifting elements doing duty as brakes. Principally, single or even all lamella brakes can be replaced by brake band construction. In non-shiftable condition, band brakes are known to be more favorable where slippage is concerned than are lamella brakes. For all shown component arrangements, it seems favorable to employ the non-shiftable brake D in the second to the sixth forward gear stage and/or the non-shifting brake A in the fifth and sixth forward travel, as well as in reverse gear as band brakes. Likewise it is possible, upon need, to reinforce the individual brakes by way of additional free run, which is kinematically placed between the input element of the of the respective brake and the transmission housing and this entry element is set as to direction of travel.

REFERENCE NUMERALS

A first shifting element, brake
B second shifting element, clutch
C third shifting element, brake
D fourth shifting element, brake
E fifth shifting element, clutch
ZYLBE lamella carrier for the second and fifth shifting element
AN input drive shaft
AB output drive shaft
GG transmission housing
GD housing cover
GW housing wall
GN hub, affixed to the transmission housing
GZ partition-wall in housing
NAN input drive shaft tachometer
NANGR sending gear
RS1 first planetary gearset
HO1 internal gear of the first planetary gearset
SO1 sun gear of the first planetary gearset
ST1 link of the first planetary gearset
PL1 planet gear of the first planetary gearset
SOW1 sun shaft of the first planetary gearset
STB11 first link-piece of the first planetary gearset
STB12 second link-piece of the first planetary gearset
RS2 second planetary gearset
HO2 internal gear of the second planetary gearset
SO2 sun gear of the second planetary gearset
ST2 link of the second planetary gearset
PL2 planet gear of the second planetary gearset
RS3 third planetary gearset
HO3 internal gear of the third planetary gearset
SO3 sun gear of the third planetary gearset
ST3 link of the third planetary gearset
PL3 planet gear of the third planetary gearset
SOW3 sun shaft of the third planetary gearset
STB3 link-piece of the third planetary gearset
STW3 link-shaft of the third planetary gearset
ZYLRS12 cylinder, connection between the link of the first planetary gearset and the internal gear of the second planetary gearset
ZYLRS13 cylinder, connection between the internal gear of the first
STST spur gear stage
STR1 first spur gear of the spur gear stage
STN1 hub of the first spur gear of the spur gear stage
100 lamellas of the first shifting elements
110 servo apparatus of the first shifting element
120 entry element of the first shifting element
200 lamellas of the second shifting element
210 servo apparatus of the second shifting element
211 pressure chamber for the servo apparatus of the second shifting element
212 pressure compensation space of the servo apparatus of the second shifting element
213 reset, return element for the servo apparatus of the second shifting element
214 piston of the servo apparatus of the second shifting element
215 seal plate of the servo apparatus of the second shifting element
216 pressure plate of the servo apparatus of the second shifting element
218 pressurized (hydraulic) media feed to the pressure chamber of the second shifting element
219 lubricant feed to the pressure compensation space of the second shifting element
220 input element of the second shifting element
221 cylindrical section of the input element of the second shifting element
222 disk-like shaped section of the input element of the second shifting element
223 hub of the input element of the second shifting element 230 output element of the second shifting element
300 lamellas of the third shifting element
310 servo apparatus of the third shifting element
320 input element of the third shifting element
400 lamellas of the fourth shifting element
410 servo apparatus of the fourth shifting element
420 input element of the fourth shifting element
500 lamellas of the fifth shifting element
510 servo apparatus of the fifth shifting element
511 pressure chamber of the fifth shifting element
512 pressure compensation room of the fifth shifting element
513 reset, return element for the servo apparatus of the fifth shifting element
514 piston of the servo apparatus of the fifth shifting element
515 cylindrically shaped reinforcement plate of the servo apparatus of the fifth shifting element
516 activation finger for the servo apparatus of the fifth shifting element
518 pressurized media feed to the pressure chamber of the fifth shifting element
519 lubricant feed to the pressure compensation space of the fifth shifting element
520 input element of the fifth shifting element
521 cylindrical section of the entry element of the fifth shifting element
522 disk-like section of the input element of the fifth shifting element
523 hub, of the input element of the fifth shifting element
530 output element of the fifth element

The invention claimed is:

1. A multistep automatic transmission comprising:
a drive shaft (AN) and an output shaft (AB);
at least first, second and third planetary gearsets (RS1, RS2, RS3) and each of the first planetary gearset (RS1), the second planetary gearset (RS2), and the third planetary gearset (RS3) comprising a sun gear, a carrier and a ring gear;
at least first, second, third, fourth and fifth shifting components (A, B, C, D, E);
the first planetary gearset (RS1), the second planetary gearset (RS2) and the third planetary gearset (RS3) being aligned co-axially with one another;
the second planetary gearset (RS2) and the third planetary gearset (RS3) are axially adjacent one another;
the sun gear (SO3) of the third planetary gearset (RS3) being engagable, via the first shifting component (A), with a transmission housing (GG) of the multistep automatic transmission;
the drive shaft (AN) being connected to the sun gear (SO2) of the second planetary gearset (RS2);
the drive shaft (AN) being at least one of: a) engagable, via the second shifting component (B), with the sun gear (SO1) of the first planetary gearset (RS1) and b) engagable, via the fifth shifting component (E), with the carrier (ST1) of the first planetary gearset (RS1);
at least one of the sun gear (SO1) of the first planetary gearset (RS1) being engagable, via the third shifting component (C), with the transmission housing (GG) and the carrier (ST1) of the first planetary gearset (RS1) being engagable, via the fourth shifting component (D), with the transmission housing (GG);
wherein one of:
i) the output shaft (AB), the ring gear (HO1) of the first planetary gearset (RS1) and the carrier (ST3) of the third planetary gearset (RS3) are connected with one another; the carrier (ST2) of the second planetary gearset (RS2) is connected with the ring gear (HO3) of the third planetary gearset (RS3), and the carrier (ST1) of the first planetary gearset (RS1) is connected with the ring gear (HO2) of the second planetary gearset (RS2), and
ii) the output shaft (AB), the ring gear (HO1) of the first planetary gearset (RS1) and the carrier (ST2) of the second planetary gearset (RS2) are connected with one another, and the carrier (ST3) of the third planetary gearset (RS3) is connected with the ring gear (HO2) of the second planetary gearset (RS2), and the carrier (ST1) of the first planetary gearset (RS1) is connected with the ring gear (HO3) of the third planetary gearset (RS3);
one shaft axially passes centrally through the second planetary gearset (RS2); and
the first shifting component (A) is a multidisk brake;
the second shifting component (B) and the fifth shifting component (E) are axially located between the first planetary gear set (RS1) and the second planetary gear set (RS2); and
the fourth shifting component (D) is radially arranged above the first planetary gearset (RS1), the second planetary gearset (RS2) and the third planetary gearset (RS3).

2. The multistep automatic transmission according to claim 1, wherein the one shaft axially passes centrally through the first planetary gearset (RS1).

3. The multistep automatic transmission according to claim 2, wherein the one shaft which axially passes centrally through both the first planetary gearset (RS1) and the second planetary gearset (RS2) is the drive shaft (AN) of the automatic transmission.

4. The multistep automatic transmission according to claim 1, wherein a disk set (500) of the fifth shifting component (E) has a larger diameter than a disk set (200) of the second shifting component (B).

5. The multistep automatic transmission according to claim 1, wherein the second shifting component (B) has a servo unit (210) for actuating a disk set (200) of the second shifting component (B) and the fifth shifting component (E) has a servo unit (510) for actuating a disk set (500) of the fifth shifting component (E); and
the second shifting component (B) and the fifth shifting component (E) form an assembly and share a common disk carrier (ZYLBE) which supports outer disks of the disk set (200) of the second shifting component (B) and inner disks of the disk set (500) of the fifth shifting component (E).

6. The multistep automatic transmission according to claim 5, wherein the common disk carrier (ZYLBE), shared by the second shifting component (B) and the fifth shifting component (E), forms a clutch space within which the disk set (200) and the servo unit (210) of the second shifting component (B) are arranged.

7. The multistep automatic transmission according to claim 5, wherein at least one of:
the servo unit (510) of the fifth shifting component (E) axially biases the disk set (500) of the fifth shifting component (E) towards the first planetary gearset (RS1) during engagement of the fifth shifting component (E), and
the servo unit (210) of the second shifting component (B) axially biases the disk set (200) of the second shifting component (B) towards the first planetary gearset (RS1) during engagement of the second shifting component.

8. The multistep automatic transmission according to claim 7, wherein at least one of:
the servo unit (510) of the fifth shifting component (E) is axially located between the disk set (500) of the fifth shifting component (E) and the second planetary gearset (RS2); and
the servo unit (210) of the second shifting component (B) is axially located between the disk set (200) of the second shifting component (B) and the second planetary gearset (RS2).

9. The multistep automatic transmission according to claim 5, wherein at least one of:
the servo unit (510) of the fifth shifting component (E) axially biases the disk set (500) of the fifth shifting component (E) toward the second planetary gearset (RS2) during engagement of the fifth shifting component (E); and
the servo unit (210) of the second shifting component (B) axially biases the disk set (200) of the second shifting component (B) toward the second planetary gearset (RS2) during engagement of the second shifting component (B).

10. The multistep automatic transmission according to claim 9, wherein at least one of:
the servo unit (510) of the fifth shifting component (E) is axially located between the disk set (500) of the fifth shifting component (F) and the second planetary gearset (RS2), and the servo unit (210) of the second shifting component (B) is axially located between the disk set (200) of the second shifting component (B) and the second planetary gearset (RS2).

11. The multistep automatic transmission according to claim 5, wherein the drive shaft (AN) axially passes centrally through the first planetary gearset (RS1) and supports at least one of the servo unit (210) of the second shifting component (B) and the servo unit (510) of the fifth shifting component (E).

12. The multistep automatic transmission according to claim 5, wherein the sun gear (SO1) of the first planetary gearset (RS1) supports at least one of the servo unit (210) of the second shifting component (B) and the servo unit (510) of the fifth shifting component (E).

13. The multistep automatic transmission according to claim 1, wherein a connection between the carrier (ST1) of the first planetary gearset (RS1) and the ring gear (HO2) of the second planetary gearset (RS2) includes an outer disk carrier of the fifth shifting component (E).

14. The multistep automatic transmission according to claim 1, wherein the third shifting component (D), when viewed axially, is arranged radially above the first planetary gearset (RS1), the second planetary gearset (RS2) and the third planetary gearset (RS3).

15. The multistep automatic transmission according to claim 14, wherein the third shifting component (C) is axially adjacent the fourth shifting component (D), each of the third shifting component (C) and the fourth shifting component (D) has a disk set (300, 400) and the disk set (300) of the third shifting component (C) and the disk set (400) of the fourth shifting component (D) each have similar dimensions.

16. The multistep automatic transmission according to claim 14, wherein the third shifting component (C) and the fourth shifting component (D) comprise a preassembled system which comprises:
a disk set (300) of the third shifting component (C);
a disk set (400) of the fourth shifting component (D);
an outer disk carrier common to the third shifting component (C) and the fourth shifting component (D);
a servo unit (310) for actuating the disk set (300) of the third shifting component (C) is at least partially integrated into the common outer disk carrier; and
a servo unit (410) for actuating of the disk set (400) of the fourth shifting component (D) is at least partially integrated into the common outer disk carrier.

17. The multistep automatic transmission according to claim 1, wherein the third shifting component (C) is axially located adjacent the first planetary gearset (RS1) on a side of the first planetary gearset (RS1) opposite the second planetary gearset (RS2).

18. The multistep automatic transmission according to claim 1, wherein the first shifting component (A) is axially located on a side of the third planetary gearset (RS3) opposite the second planetary gearset (RS2).

19. The multistep automatic transmission according to claim 18, wherein the first shifting component (A) is axially arranged adjacent to the third planetary gearset (RS3).

20. The multistep automatic transmission according to claim 1, wherein the first shifting component (A) is axially arranged adjacent to one of an outer wall of the transmission housing (GG) and a transmission housing cover, which is connected to the transmission housing (GG) in a rotationally fixed manner and constitutes an outer wall of the automatic transmission.

21. The multistep automatic transmission according to claim 1, wherein the first shifting component (A), when viewed axially, is arranged radially about the third planetary gearset (RS3).

22. The multistep automatic transmission according to claim 21, wherein the first shifting component (A) is axially adjacent the fourth shifting component (D), each of the first shifting component (A) and the fourth shifting component (D) has a disk set (100, 400) and the disk set (100) of the first shifting component (C) and the disk set (400) of the fourth shifting component (D) have similar dimensions.

23. The multistep automatic transmission according to claim 21, wherein the first shifting component (A) and the fourth shifting component (D) comprise a preassembled system which comprises:
a disk set (100) of the first shifting component (A);
a disk set (400) of the fourth shifting component (D);
an outer disk carrier common to the first shifting component (A) and the fourth shifting component (D);
a servo unit (110) for actuating the disk set (100) of the first shifting component (A) is at least partially integrated into the common outer disk carrier; and
a servo unit (410) for actuating the disk set (400) of the fourth shifting component (D) is at least partially integrated into the common outer disk carrier.

24. The multistep automatic transmission according to claim 1, wherein an axis of the drive shaft (AN) and an axis of the output shaft (AB) are one of parallel to one another and arranged at angle with respect to one another.

25. The multistep automatic transmission according to claim 1, wherein one of a first spur gear (STR1), of a spur gear stage (STST), and a first sprocket wheel, of a chain drive, is axially located between the third planetary gearset (RS3) and the first shifting component (A);
one of:
the output shaft (AB) is actively coupled, via one of the spur gear stage (STST) and the chain drive, to the ring gear (HO1) of the first planetary gearset (RS1) and the ring-gear (HO1)-linked carrier (ST3) of the third planetary gearset (RS3); and
the output shaft (AB) is actively coupled, via one of the spur gear stage (STST) and the chain drive, to the ring gear (HO1) of the first planetary gearset (RS1) and the ring-gear (HO1)-linked carrier (ST2) of the second planetary gearset (RS2).

26. The multistep automatic transmission according to claim 1, wherein one of a first spur gear (STR1), of a spur gear stage (STST), and a first sprocket wheel, of a chain drive, is axially located adjacent to one of an outer wall of the transmission housing (GG) and a housing cover fixed to the transmission housing (GG);
one of:
    the output shaft (AB) is actively coupled, via one of the spur gear stage (STST) and the chain drive, to the ring gear (HO1) of the first planetary gearset (RS1) and the ring-gear (HO1)-linked carrier (ST3) of the third planetary gearset (RS3); and
    the output shaft (AB) is actively coupled, via one of the spur gear stage (STST) and the chain drive, to the ring gear (HO1) of the first planetary gearset (RS1) and the ring-gear (HO1)-linked carrier (ST2) of the second planetary gearset (RS2).

27. The multistep automatic transmission according to claim 26, wherein the first sprocket wheel is axially located adjacent to one of an outer wall of the transmission housing (GG) and a housing cover fixed to the transmission housing (GG) and the first shifting component (A) is located axially adjacent to the third planetary gearset (RS3) within a cylinder space formed by the first sprocket wheel of the chain drive.

28. The multistep automatic transmission according to claim 1, wherein the drive shaft (AN) and the output shaft (AB) are coaxial with one another.

29. The multistep automatic transmission according to claim 1, wherein the drive shaft (AN) and the output shaft (AB) are coaxial with one another.

30. The multistep automatic transmission according to claim 29, wherein the output shaft (AB), which is actively connected to the ring gear (HO1) of the first planetary gearset (RS1), axially passes centrally through the third planetary gearset (RS3).

31. The multistep automatic transmission according to claim 29, wherein the output shaft (AB), which is actively linked to the ring gear (HO1) of the first planetary gearset (RS1), axially passes centrally through a clutch space of the first shifting component (A) and the clutch space is formed by at least one of a disk carrier and a servo unit (110) of the first shifting component (A).

32. The multistep automatic transmission according to claim 1, wherein selective engagement of the first, the second, the third, the fourth and the fifth shifting components (A, B, C, D, E) achieves a variety of gear ratios such that, when shifting from one gear ratio to one of a next higher gear ratio and a next lower gear ratio, only one of the first, the second, the third, the fourth and the fifth shifting components (A, B, C, D, E), which are actuated, is disengaged and only one of the first, the second, the third, the fourth and the fifth shifting components (A, B, C, D, E) is engaged so that at least six forward gear ratios and one reverse gear ratio are implemented whereby:
a first forward gear ratio is implemented by engaging the first shifting component (A) and the fourth shifting component (D);
a second forward gear ratio is implemented by engaging the first shifting component (A) and the third shifting component (C);
a third forward gear ratio is implemented by engaging the first shifting component (A) and the second shifting component (B);
a fourth forward gear ratio is implemented by engaging the first shifting component (A) and the fifth shifting component (E);
a fifth forward gear ratio is implemented by engaging the second shifting component (B) and the fifth shifting component (E);
a sixth forward gear ratio is implemented by engaging the third shifting component (C) and the fifth shifting component (E); and
the reverse gear ratio is implemented by engaging the second shifting component (B) and the fourth shifting components (D).

33. A multistep automatic transmission comprising;
a drive shaft (AN) and an output shaft (AB);
at least first, second and third planetary gearsets (RS1, RS2, RS3) and each of the first planetary gearset (RS1), the second planetary gearset (RS2), and the third planetary gearset (RS3) comprising a sun gear, a carrier and a ring gear;
at least first, second, third, fourth and fifth shifting components (A, B, C, D, E);
the first planetary gearset (RS1), the second planetary gearset (RS2) and the third planetary gearset (RS3) being aligned co-axially with one another;
the second planetary gearset (RS2) and the third planetary gearset (RS3) are axially adjacent one another;
the sun gear (SO3) of the third planetary gearset (RS3) being engagable, via the first shifting component (A), with a transmission housing (GG) of the multistep automatic transmission;
the drive shaft (AN) being connected to the sun gear (SO2) of the second planetary gearset (RS2);
the drive shaft (AN) being at least one of: a) engagable, via the second shifting component (B), with the sun gear (SO1) of the first planetary gearset (RS1) and b) engagable, via the fifth shifting component (F), with the carrier (ST1) of the first planetary gearset (RS1);
at least one of the sun gear (SO1) of the first planetary gearset (RS1) being engagable, via the third shifting component (C), with the transmission housing (GG) and the carrier (ST1) of the first planetary gearset (RS1) being engagable, via the fourth shifting component (D), with the transmission housing (GG);
wherein one of:
    i) the output shaft (AB), the ring gear (HO1) of the first planetary gearset (RS1) and the carrier (ST3) of the third planetary gearset (RS3) are connected with one another; the carrier (ST2) of the second planetary gearset (RS2) is connected with the ring gear (HO3) of the third planetary gearset (RS3), and the carrier (ST1) of the first planetary gearset (RS1) is connected with the ring gear (HO2) of the second planetary gearset (RS2), and
    ii) the output shaft (AB), the ring gear (HO1) of the first planetary gearset (RS1) and the carrier (ST2) of the second planetary gearset (RS2) are connected with one another, and the carrier (ST3) of the third planetary gearset (RS3) is connected with the ring gear (HO2) of the second planetary gearset (RS2), and the carrier (ST1) of the first planetary gearset (RS1) is connected with the ring gear (HO3) of the third planetary gearset (RS3);
one shaft axially passes centrally through the second planetary gearset (RS2); and
the first shifting component (A) being a multidisk brake;

the second shifting component (B) and the fifth shifting component (E) are axially located between the first planetary gear set (RS1) and the second planetary gear set (RS2);

the fourth shifting component (D) is radially arranged above the first planetary gearset (RS1), the second planetary gearset (RS2) and the third planetary gearset (RS3); and the output shaft (AB) communicates, via a link-shaft (STW3), with the third planetary gearset (RS3), the link-shaft (STW3) is coaxial with the drive shaft (AN).

34. The multistep automatic transmission according to claim 33, wherein the drive shaft (AN) axially passes centrally through the link-shaft (STW3).

35. A multistep automatic transmission comprising;

a drive shaft (AN) and an output shaft (AB);

at least first, second and third planetary gearsets (RS1, RS2, RS3) and each of the first planetary gearset (RS1), the second planetary gearset (RS2), and the third planetary gearset (RS3) comprising a sun gear, a carrier and a ring gear;

at least first, second, third, fourth and fifth shifting components (A, B, C, D, E);

the first planetary gearset (RS1), the second planetary gearset (RS2) and the third planetary gearset (RS3) being aligned co-axially with one another;

the second planetary gearset (RS2) and the third planetary gearset (RS3) are axially adjacent one another;

the sun gear (SO3) of the third planetary gearset (RS3) being engagable, via the first shifting component (A), with a transmission housing (GG) of the multistep automatic transmission;

the drive shaft (AN) being connected to the sun gear (SO2) of the second planetary gearset (RS2);

the drive shaft (AN) being at least one of: a) engagable, via the second shifting component (B), with the sun gear (SO1) of the first planetary gearset (RS1) and b) engagable, via the fifth shifting component (E), with the carrier (ST1) of the first planetary gearset (RS1);

at least one of the sun gear (SO1) of the first planetary gearset (RS1) being engagable, via the third shifting component (C), with the transmission housing (GG) and the carrier (ST1) of the first planetary gearset (RS1) being engagable, via the fourth shifting component (D), with the transmission housing (GG);

wherein one of:

i) the output shaft (AB), the ring gear (HO1) of the first planetary gearset (RS1) and the carrier (ST3) of the third planetary gearset (RS3) are connected with one another; the carrier (ST2) of the second planetary gearset (RS2) is connected with the ring gear (HO3) of the third planetary gearset (RS3), and the carrier (ST1) of the first planetary gearset (RS1) is connected with the ring gear (HO2) of the second planetary gearset (RS2), and ii) the output shaft (AB), the ring gear (HO1) of the first planetary gearset (RS1) and the carrier (ST2) of the second planetary gearset (RS2) are connected with one another, and the carrier (ST3) of the third planetary gearset (RS3) is connected with the ring gear (HO2) of the second planetary gearset (RS2), and the carrier (ST1) of the first planetary gearset (RS1) is connected with the ring gear (HO3) of the third planetary gearset (RS3);

one shaft axially passes centrally through the second planetary gearset (RS2); and the first shifting component (A) being a multidisk brake;

the second shifting component (B) and the fifth shifting component (E) are axially located between the first planetary gear set (RS1) and the second planetary gear set (RS2);

the fourth shifting component (D) is radially arranged above the first planetary gearset (RS1), the second planetary gearset (RS2) and the third planetary gearset (RS3); and the drive shaft (AN) axially passes centrally through the link-shaft (STW3).

36. The multistep automatic transmission according to claim 35, wherein the one shaft axially passing centrally through the second planetary gearset (RS2) is the drive shaft (AN).

* * * * *